May 12, 1970  R. F. SHANNON ET AL  3,511,789
POLYMERIZABLE MATERIALS OF IMPROVED STABILITY
AND FOAMS PRODUCED THEREFROM
Filed April 21, 1966  2 Sheets-Sheet 1
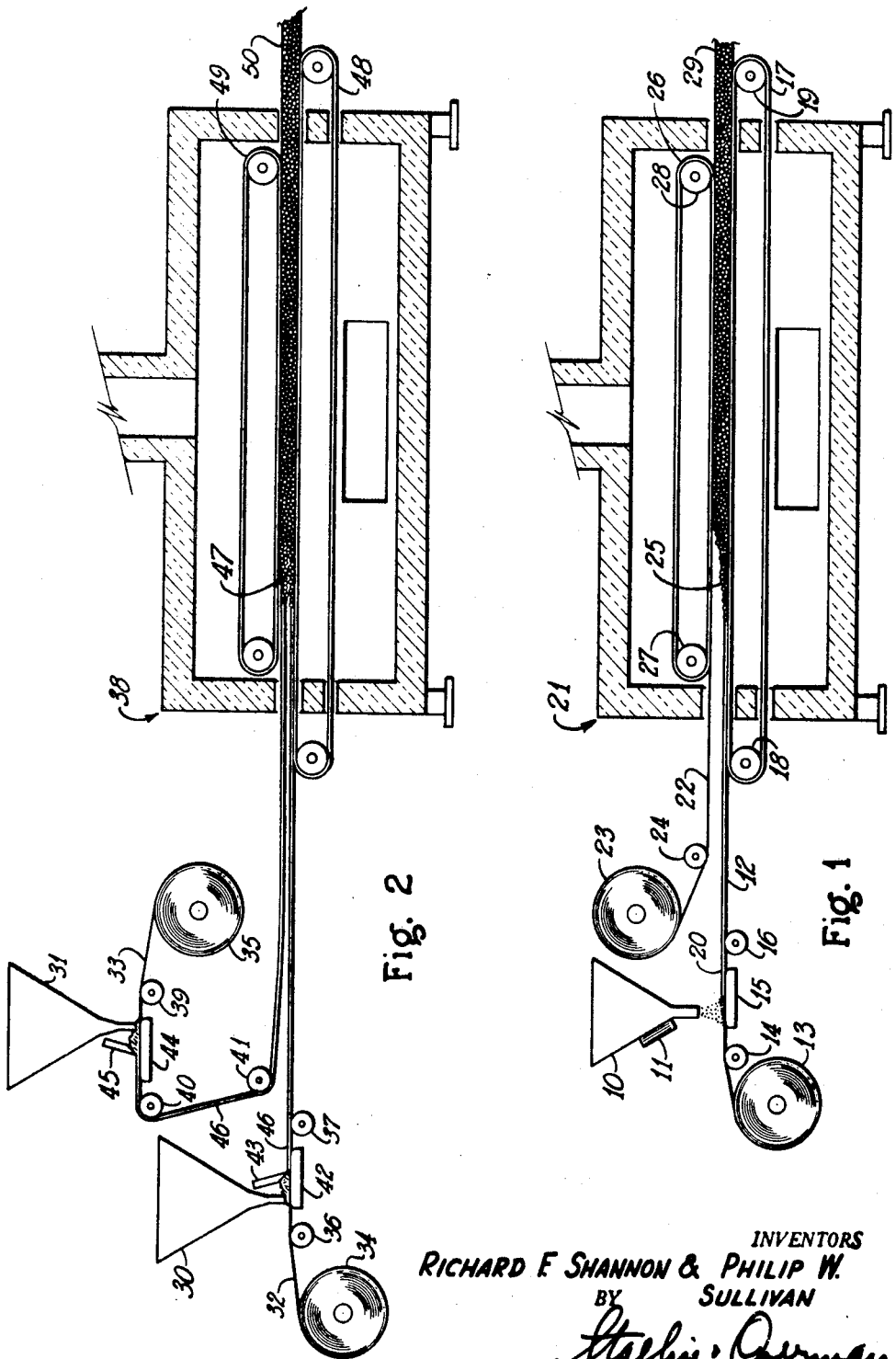
INVENTORS
RICHARD F. SHANNON & PHILIP W. SULLIVAN
BY
ATTORNEYS

RICHARD F. SHANNON &
PHILIP W. SULLIVAN
INVENTORS

BY Staelin & Overman
ATTORNEYS 3,511,789
Patented May 12, 1970

3,511,789
POLYMERIZABLE MATERIALS OF IMPROVED STABILITY AND FOAMS PRODUCED THEREFROM
Richard F. Shannon, Lancaster, and Philip W. Sullivan, Newark, Ohio, assignors to Owens-Corning Fiberglas Corporation, a corporation of Delaware
Continuation-in-part of application Ser. No. 251,346, Jan. 14, 1963. This application Apr. 21, 1966, Ser. No. 544,291
Int. Cl. C08g 51/58, 53/10
U.S. Cl. 260—2.5
42 Claims

ABSTRACT OF THE DISCLOSURE

A stabilized polymerizable material of the type wherein an active hydrogen on one molecule reacts with another material to add or condense into a higher molecular polymer. The polymerizable material is stabilized by a minor amount of a material the molecules of which contain nucleophilic groups which hydrogen bond with the active hydrogen of the polymerizable material to "blank off" the active hydrogen and hinder polymerization below elevated temperatures. The "blanked off" resin forming material has particular utility when used in foaming combinations of materials to prevent polymerization of the resinous forming materials before foaming takes place.

---

The invention relates to polymerizable compositions having reduced activity at moderate temperatures but which will react completely at elevated temperatures; and more particularly to foamable compositions that include the polymerizable materials having reduced activity at moderate temperatures.

The present application is a continuation-in-part application of our copending application Ser. No. 251,346, filed Jan. 14, 1963, which in turn is a continuation-in-part of our copending applications Ser. No. 79,206, filed Dec. 29, 1960; Ser. No. 799,369, filed Mar. 13, 1959; Ser. No. 79,363, filed Dec. 29, 1960; Ser. No. 79,364, filed Dec. 29, 1960; Ser. No. 79,205, filed Dec. 29, 1960; Ser. No. 96,206 filed Mar. 16, 1961; Ser. No. 96,129, filed Mar. 16, 1961; and Ser. No. 96,162, filed Mar. 16, 1961, all now abandoned.

There are generally two types of polymerization reactions. In one type of polymerization reaction, a reaction proceeds by the liberation of a proton, or hydrogen ion, to a nucleophilic atom on another molecule. Upon liberation of the proton from the first material, the first material becomes nucleophilic. Upon reaction of the proton with the second molecule, there is usually a splitting off of material (usually water or ammonia) to change the second molecule into an electrophilic molecule. The now electrophilic second molecule reacts with the nucleophilic first molecule to link up the two molecules and produce a polymer. The proton before leaving the first molecule is what is known as a labile hydrogen atom, which because of charge unbalance in the first molecule is loosely held and so is active or reactive with another nucleophilic material. The most common type of nucleophilic material is the hydroxy ion. The most common type of electrophilic material is the proton. Since acids supply protons, and bases supply hydroxy groups, the most common electrophile-nucleophile reaction is an acid-base reaction. The terms nucleophilic and electrophilic are broader than the terms acids and bases, however, and some bases may act as acids with respect to some materials, while some materials normally considered to be acids may act as bases with respect to other materials. In any such reaction, however, there will be an electrophilic and a nucleophilic atom involved. The first and second atoms may be monomers, they may be separate polymers, or they may be different atoms on the same type of molecule which react into a long chain polymer such as occurs in polyesters.

In the other type of polymerization reaction, condensation of olefine materials takes place by the combining of two molecules each having a double bond. This type of action is usually carried out with a free radical catalyst, and therefore proceeds differently from the type of polymerization first described.

It has now been found possible in the type of polymerization first described to hydrogen bond a generally large, and therefore somewhat immobile and bulky molecule, to the labile hydrogen of a polymerizable material to partially satisfy the electron unbalance of the labile hydrogen and therefore make it more stable. In addition the large size molecule provide stereo hindrance to "plug off" the labile hydrogen from nucleophilic molecules. Low molecular weight polar materials such as water, and the lower alcohols will hydrogen bond, but they do not produce the same result because they do not provide the necessary "plugging off" or stereo hindrance necessary to keep an electrophilic molecule from reacting with the labile hydrogen.

Hydrogen bonds are generally only stable at low temperatures, and when hydrogen bonded materials are heated, the increase in molecular activity of the joined molecules increases to a point where the hydrogen bond is broken, and the two bonded materials go back to their original unbonded condition. This breaking of the hydrogen bond may occur at a fixed temperature when two pure chemicals are hydrogen bonded together; but in the usual system where pure, simple chemicals are not involved, the breaking of the hydrogen bonds will occur over a range in temperature. In the usual polymeric systems, the molecular weight and degrees of resonance of the largest molecules are sufficiently different from the smaller molecules that the hydrogen bonds break apart over a range of temperature. Because the hydrogen bonded materials go back to their original condition when the hydrogen bond is broken, a hydrogen bond does not interfere with the degree of polymerization which can occur. Once hydrogen bonded materials are heated sufficiently to break all of the hydrogen bonds, the materials link up to as strong a condition as occurs when previously unhydrogen bonded materials are polymerized.

The "plugging off" of the labile hydrogen of a polymerizable material has particular advantages in foamable polymeric compositions. Polymerization of most materials occurs over a broad temperature range, while the disruption of most "blowing agents" occurs at a generally predetermined temperature, or temperature range.

Since the polymerization reaction of all known resinous materials occurs over a range in temperature, while the liberation of autogeneously produced gases occurs at a generally fixed temperature, a common problem exists in all resin systems in the production of small uniform cell walls throughout the foamed resin. It will be seen that as a mixture of polymerizable material, regardless of the type of polymer involved, and a blowing agent is raised in temperature, polymerization of the resin will start to occur before the blowing agent begins to liberate its gases. The polymerization reaction is not a uniform reaction, because an infinite variation in size and arrangement of molecules exist as the polymerization is advanced, and therefore some of the resin is polymerized to a high viscosity while other areas of the material may be generally at a lower viscosity. Since the autogeneously produced gases, stretch the polymer into thin cell walls, the more advanced material will not stretch to as great a degree as does the less advanced material, thereby causing some of the cell walls to break. Upon breakage, a new cell of twice the size and of nonuniform wall thickness is formed. It will be seen that, by hydrogen bonding a molecule of appreciable size to the labile hydrogen of a polymerizable material, the polymerization reaction can be controlled, so that it does not advance materially until after the time that the blowing agent has uniformly produced its gases and has stretched the polymerizable viscous material into uniform cell walls. As has previously been indicated, hydrogen bonds can be completely disrupted by temperature, and so as the polymerizable foamable mixture is further raised in temperature, the polymerization reaction takes place and goes to completion to produce a very fine uniform cell structure.

Materials effective to produce the "blocking off" of the labile hydrogen are also effective as surface active agents in some systems, particularly where water is present. Surface active agents are large sized molecules having one end portion which is oleophilic, and another end portion which is hydrophilic. Because opposite ends of these surface active agents have different affinities, they locate themselves at an interface between two materials with the opposite end portions extending across the interface into respective materials. The hydrophilic portion of these molecules is polar in nature in order to be compatible with water or other semi-polar solvent, and may even be ionic. Where the material is ionic, it will usually be so strongly electrophilic or nucleophilic as to react with the labile hydrogen, and thereby defeat the "blocking off" that is desired in the present invention. The polar groups therefore must be nonionic or very weakly ionic, so that they do not react but only hydrogen bond with labile hydrogen. To perform this function most adequately, the blocking agent will best have oxygen, nitrogen, or phosphorus with an unshared pair of electrons present, for the bonding to the polymerizable material. As previously indicated, the oxygen, nitrogen, or phosphorus should not be part of an ionic group but should be linked to other atoms in a generally stable covalent relationship. Ammonium groups in general are only semi-ionic in nature and are capable of hydrogen bonding without reacting. Alkali metal, alkaline earth and other metal salts of carboxylic acid, however, cannot hydrogen bond. These materials are strongly ionic and will react under the conditions of the present invention. Hydroxyl groups even on organic molecules will react with the labile hydrogen unless they are present in such a small proportion relative to the remainder of the molecule on which they are located as to be substantially unreactive. Polyglycols have two hydroxyl groups per molecule and therefore are reactive under the conditions of the present invention substantially regardless of their molecular weight. Monoesters of polyglycols will in general have sufficiently low reactivity for use in the present invention where the mol ratio of ethylene-oxide to the monovalent carboxylic acid is greater than approximately 5 to 1, and provided that the carboxylic acid is a high molecular weight acid as for example, fatty acid.

Water is referred to as a universal solvent because it contains polar molecules of small size and high mobility. The water molecules can be in around organo molecules and solvate polar groups. These water molecules are, however, easily displaced, and offer so very little hindrance as to be substantially ineffective in preventing a labile hydrogen of a polymer molecule from seeking out and attaching to a nucleophilic group of another molecule. There is reason to believe that solvated molecules have increased mobility, so that water may not only not prevent polymerization, but may aid in bringing the polymer molecules together for reaction. What has been said about water will also apply to other polar solvents of low molecular weight, as for example, methyl, ethyl, proply, and butyl alcohols, and comparable amines.

An object of the present invention is the provision of polymerizable materials having stability at ambient and/ or moderate temperatures, but which will react completely at elevated temperatures.

Another object of the invention is the provision of a new and improved method of preventing polymerizable materials containing blowing agents from increasing their molecular weight appreciably below the elevated temperatures at which the conventional blowing agents release their gases.

Another object of the invention is the provision of new and improved foams of polymeric materials.

A more detailed object is the provision of a new and improved foamed material of aldehyde type polymers, such as the phenol-formaldehyde, urea-formaldehyde, and melamine-formaldehyde.

It is a further object of the invention to provide various articles produced from a foamable composition comprising a novolac.

Other objects and advantages will be apparent from the description which follows, reference being made to the accompanying drawings, in which—

FIG. 1 is a schematic showing of apparatus in which a foamable composition comprising a novolac can be used in the manufacture of a simple article suited for use as a low temperature thermal insulation;

FIG. 2 is a similar showing of a modified apparatus in which such an article can be produced.

Figure 4:
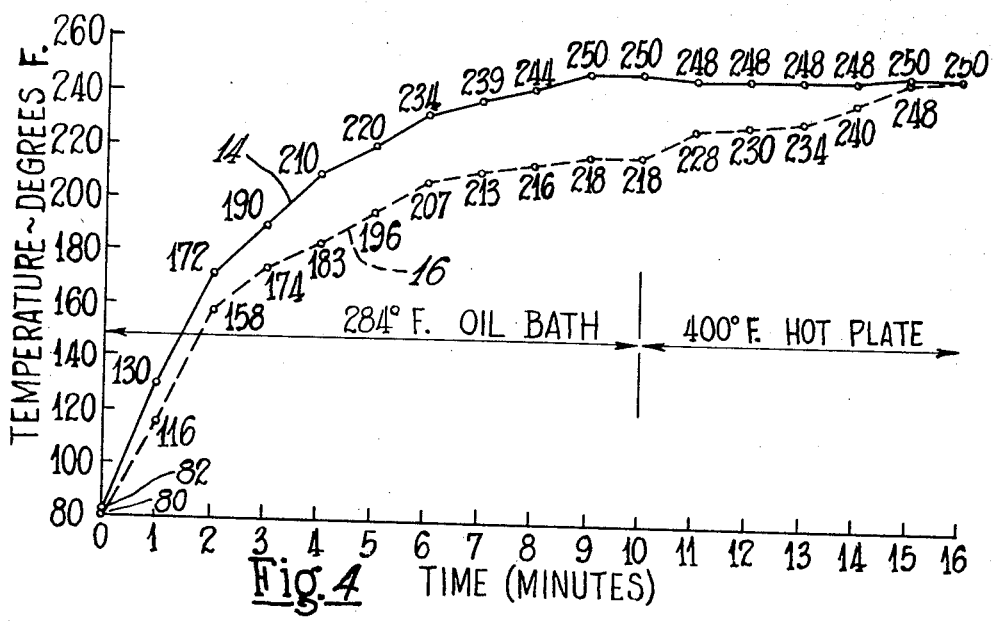
FIGS. 3–5 are graphs of temperature versus time during the heating of various resin mixtures, and indicate differences between "plugged off" resins, and "nonplugged off" resins.

A foamable composition is provided according to the invention. Such foamable composition comprises about 80 parts of a novolac or novolac type resin having reactive hydrogen atoms or the benzene rings, a quantity of a curing agent which is reactive with the novolac resin, by connecting molecules thereof through methylene groups, and sufficient in amount to convert, at an elevated temperature, the novolac to a thermoset condition, and from about 0.02 part to about 10 parts of an effective surface active agent having negative atoms that are capable of forming a hydrogen bond with the reactive hydrogen atoms on the benzene rings of the resin. The surface active hydrogen bonding agent is not limited to but may be selected from the group consisting of the following eight families: (1) polyoxyethylene sorbitan monoesters, (2) oxazoline compounds, (3) cationic surface active agents selected from the group consisting of certain tertiary amines and quaternary ammonium halide salts, (4) cationic surface active agents selected from the group consisting of certain imidazoline compounds and imidazolininum halide salts, (5) nonylphenoxy polyoxyethylene ethanols, (6) polyoxyethylene glycol esters, (7) water-soluble salts of substituted benzoyl sulfopropionic acid esters, and (8) ammonium salts of the acid sulfate of certain hydroxyl-containing compounds.

Each of the groups of effective hydrogen bonding surface active agents is further defined and discussed below.

With regard to the monoesters, excellent results have been achieved using monoesters of relatively long chain alkyl or alkenyl monocarboxylic acids. For example, polyoxyethylene sorbitan monopalmitates, polyoxyethylene sorbitan monolaurates and polyxyethylene sorbitan monooleates have all been used with excellent results. Such monoesters are water-soluble liquids of low volatility. They are preferably made by the direct reaction between ethylene oxide and the sorbitan monoester. The reaction is well known, conditions therefor being described in U.S. Pat. No. 1,922,459, as well as elsewhere in published art. Similar products can be made by condensing preformed polyethylene glycols and the monoesters by classical etherification reactions. In either case, the sorbitan monoesters will usually be of a mixed nature, differing from one another with respect to the number of oxyethylene groups per mol, and also with respect to the structural distribution of oxyethylene groups. If desired, mixtures of two or more polyoxyethylene sorbitan monoesters can be used, although there is ordinarily relatively little reason for such an expedient since the various monoesters affect foamable novolac compositions in much the same way.

It is usually preferred that the polyoxyethylene sorbitan monoester used in a foamable composition according to the invention be produced, in one of the indicated manners, from ethylene oxide or equivalent and the sorbitan monoester in proportions of from about 3 to about 30 moles of ethylene oxide per mol of the sorbitan monoester. It is also preferred that the monoester be one formed from sorbitan and an acid having the generic formula RCOOH where R is an acyclic hydrocarbon radical having from about 8 to about 20 carbon atoms. Most desirably, R is an n-alkyl or an n-alkenyl radical having from about 8 to about 20 carbon atoms.

The oxazoline compound is selected from the group consisting of 2-substituted-2-oxazoline compounds of the formula

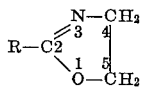

in which R is selected from the group consisting of the phenyl radical and the aliphatic radicals, $C_nH_{2n}$ and $C_nH_{2n+1}$, wherein $n$ represents a whole number integer of from 5 to 27, and 4-substituted derivatives of said 2-substituted-2-oxazoline compounds having from one to two hydrogen atoms on the 4-position carbon atoms replaced by from one to two radicals, respectively, selected from the group consisting of alkyl radicals of from 1 to 4 carbon atoms, the hydroxymethyl radical, the hydroxyethyl radical, and the radicals from esterification of the hydroxymethyl and hydroxyethyl radicals with a monocarboxylic acid from the group consisting of benzoic acid and fatty acids of from 6 to 28 carbon atoms.

Suitable oxazoline compounds for practice of the invention are available commercially. Suitable oxazoline compounds also may be prepared by various methods known and illustrated in the art. For example, oxazoline compounds may be formed from N-beta-hydroxy-ethyl fatty amides by ring closure as shown in U.S. Pats. 2,372,409 and 2,504,951. Illustrative of such a preparation is the condensing of a fatty acid with 2-amino-1,3-propanediol to yield a 2-fatty alkyl substituted -2-oxazoline compound having a hydroxyethyl group substituted in the 4-position. If desired, the hydroxyethyl group of this oxazoline compound may be esterified with the original fatty acid or with benzoic acid or a different fatty acid to obtain other oxazoline compounds. Operability of the invention is not apparently dependent on particular methods or starting materials, so long as the particular oxazoline compound thereby produced is a member of the aforesaid group of suitable oxazoline compounds. In many instances of preparation of a suitable oxazoline compound, there will be used grades of fatty acids which are a mixture of several requisite fatty acids. In these preparations the resulting products are mixtures of several suitable oxazoline compounds with such resulting mixtures also being useful for practice of the invention.

A partial listing of useful oxazoline compounds for practice of the invention includes:

2-phenyl-4-methyl-4-benzooxymethyl-2-oxazoline;
2-heptyl-4-methyl-4-octanooxymethyl-2-oxazoline;
2-nonyl-4-methyl-4-decanooxymethyl-2-oxazoline;
2-nonyl-4-ethyl-4-decanooxymethyl-2-oxazoline;
2-pentyl 4,4-bis(hexanooxymethyl)-2-oxazoline;
2-heptadecyl-4,4-bis(stearoxymethyl)-2-oxazoline;
2-phenyl-4-benzooxymethyl-2-oxazoline;
2-undecyl-4-lauroxymethyl-2-oxazoline;
2-undecyl-4-methyl-4-propionoxymethyl-2-oxazoline;
2-undecyl-4-methyl-4-benzoxymethyl-2-oxazoline;
2-phenyl-4-methyl-4-lauroxymethyl-2-oxazoline;
2-tricosyl-4-methyl-4-hydroxyethyl-2-oxazoline;
2-heptadecyl-2-oxazoline;
2-phenyl-2-oxazoline;
2-heptadecenyl-4-hydroxyethyl-2-oxazoline;
2-heptyl-4-ethyl-4-oxtanooxyethyl-2-oxazoline;
2-heptadecyl-4-hydroxyethyl-2-oxazoline;
2-heptadecyl-4-ethyl-2-oxazoline;

and the like. The lower molecular weight, i.e. a molecular weight less than about 400, suitable oxazoline compounds generally are amber, yellow-colored liquids and are preferred, while the higher molecular weight suitable oxazoline compounds are usually light brown waxy-type solids.

The first family of hydrogen bonding cationic surface-active agents is selected from the group consisting of imidazoline compounds of the formula:

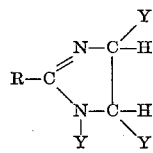

in which R is selected from the group consisting of the phenyl radical and aliphatic hydrocarbon radicals of from 5 to 27 carbon atoms, and in which Y is selected from the group consisting of hydrogen, hydroxymethyl, hydroxyethyl, and alkyl and alkylene radicals of up to 5 carbon atoms, and their imidazolinium halide salts of the formula:

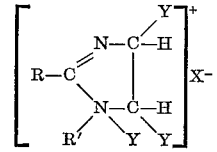

in which R' is selected from the group consisting of the benzyl radical, and alkyl and alkylene radicals of up to 28 carbon atoms, and in which X is a halogen radical selected from the group consisting of chlorine, bromine, and iodine radicals.

Suitable cationic hydrogen bonding surface-active agents suitable for practice of the invention are available commercially. Suitable agents may also be prepared by various methods known to the art. For example, imidazoline compounds may be formed by condensing fatty acids with aliphatic diamines, such as ethylene diamine or derivatives of ethylene diamine having sufficient free hydrogen on the nitrogen atoms for the reaction, as shown in German Pat. No. 664,475 and French Pat. No. 852,031. Illustrative of such a preparation is the condensation of lauric acid with ethylene diamine to obtain 2-undecylimidazoline. Additional teachings of imidazoline compounds are illustrated by U.S. Pats. Nos. 2,155,877, 2,155,878, 2,214,152, 2,215,861, 2,215,862, 2,215,833, 2,215,864, and 2,369,818. The imidazolinium halide salts may be prepared by reaction of the imidazoline with a benzyl or alkyl halide as shown in U.S. Pats. Nos. 2,418,077, 2,574,537, and 2,659,731. By starting with substituted derivatives of the aliphatic diamines or by alkylating the imidazoline compound, there may be prepared various substituted derivatives of the imidazoline compounds, which, if desired, then may be converted to imidazolinium halide salts. Operability of the invention is not apparently dependent on particular methods or starting materials, as long as the particular agent thereby produced is a member of the aforesaid group of suitable agents. In many of these preparations there will be used commercial grades of fatty acids which are mixtures of several fatty acids. In these preparations the resulting products are mixtures of several of the suitable agents with such resulting mixtures being also useful for practice of the invention.

A partial listing of useful hydrogen bonding cationic surface-active agents for practice of the invention includes:
2-heptyl-imidazoline;
2-undecylimidazoline;
2-heptadecylimidazoline;
2-heptadecenylimidazoline;
2-pentacosylimidazoline;
2-phenylimidazoline;
2-phenyl-4-methyl-imidazoline;
1-methyl-2-pentyl-midazoline;
1,4-dimethyl-2-heptylimidazoline;
1,4-dimethyl-3-phenyl-imidazoline;
2-undecyl-4-methyl-imidazoline;
2-heptadecenyl-4-methyl-imidazoline;
1-(2-hydroxyethyl)-2-heptadecenyl-imidazoline;
1-2(2-hydroxyethyl)-2-undecyl-imidazoline;
1-2(2-hydroxyethyl)-2-tridecylimidazoline;
1-2(2-hydroxyethyl)-2-pentadecyl-imidazoline;
1-allyl-2-dodecyl imidazoline;
1-allyl-2-dodecyl imidazoline;
1-methylallyl-2-dodecyl imidazoline;
1-allyl-2-(tridecen-1-yl-1)-imidazoline;
2-tridecyl-4-methyl-imidazoline;
2-pentadecyl-4-methyl-imidazoline;
1,4-dimethyl-2-heptyl-imidazoline;
1,4-dimethyl-2-phenylimidazoline;
1-methyl-2-pentadecyl-4,5-diethyl-imidazoline;
1,4-diethyl-2-undecyl-imidazoline;
1-propyl-2-undecyl-imidazoline;
benzyl 1-methyl-2-pentyl-imidazolinium chloride;
stearyl 1-methyl-2-pentyl-imidazolinium chloride;
benzyl 2-phenyl-imidazolinium chloride;
pentadecyl 1,4-diethyl-2-unadecylimidazolinium chloride;
and the corresponding imidazolinium bromide and iodide salts; and the like.

The second family of hydrogen bonding cationic surface-active agents is selected from the group consisting of tertiary amines and quaternary ammonium halide salts of the formulae, $R_3N$ and $R_4N^+X^-$, respectively, in which each R is a radical selected from the group consisting of $C_6H_5$, $C_nH_{2n+1}$, $C_mH_{2m}$, $C_6H_5CH_2$, and $$(CH_2CH_2O)_xH$$

wherein $n$ represents a whole number integer of from 1 to 28, $m$ represents a whole number integer of from 1 to 28, and $x$ represents a whole number integer of from 1 to 30, in which at least one R is a long-chain aliphatic radical from the group consisting of $C_nH_{2n+1}$ and $C_mH_{2m}$ wherein the $n$ and $m$ each are more than 7, and in which X is a halogen selected from the group consisting of chlorine, bromine, and iodine.

Suitable tertiary amines for practice of the invention are available commercially. Suitable teriary amines also may be prepared by various methods known and illustrated in the art. For example, fatty primary and secondary amines readily add ethylene oxide to form first the corresponding B-hydroxyethyl fatty tertiary amine and then the polyethanoxy tertiary amines. Operability of the invention is not apparently dependent on any particular method or starting materials used to produce a tertiary amine so long as the tertiary amine, thereby produced, contains at least one long-chain alkyl or alkenyl radical of from 8 to 28 carbon atoms, along with the other radicals selected from the group consisting of alkyl and alkenyl radicals of from 1 to 28 carbon atoms, the phenyl radical, the benzyl radical, the ethanol radical, and ethenoxy ethanol radicals of from 1 to 49 ethenoxy units. Excellent results have been achieved with tertiary amines containing at least one long chain n-alkyl or n-alkenyl radical of more than 7 carbon atoms. Particularly useful as a source of such long-chain hydrocarbon radicals are the longer-chain natural or hydrogenated fatty acids, which after converting to the corresponding alkyl or alkenyl halide are converted to tertiary amines in manners known to the art. In many cases the tertiary amines from such sources of long-chain radicals are of a mixed nature with the result being a tertiary amine mixture useful for practice of the invention. For example, with a commercially pure palmitic acid, i.e. about 93% palmitic acid, 2% myristic acid, and 5% stearic acid, as the source of the long-chain aliphatic radial, there may be prepared a tertiary amine mixture comprising, for example 93% palmitic fatty alkyl dimethylamine, 2% myristic fatty alkyl dimethylamine, and 5% stearic fatty alkyl dimethylamine. A partial listing of tertiary amines useful for practice of the invention includes: n-decyldimethylamine; n-dodecyldimethylamine; n-heptadecenyldimethylamine; n-octadecyldimethylamine; n-hexacosadimethylamine, coconut fatty alkyl dimethylamine, coconut fatty alkyl methyl aniline; n-octyldiethylamine; n-hexadecyldiethylamine; n-dodecylbenzylmethylamine; n-octyldibenzylamine; n-hexadecyldiethanolamine; lauryldiethylamine; stearyldimethylamine; n-octyldiphenylamine; stearyl fatty alkyl diepoxyethylene ethanol amine; lauryl diepoxyethylene ethanol amine; stearyl diethanol amine; and the like.

Suitable quaternary ammonium halide salts for practice of the invention are available commercially or may be prepared by numerous methods known to the art. Frequently the quaternary ammonium halide salts are prepared by reaction of an alkyl, or alkenyl, or benzyl halide with a tertiary amine, such as disclosed in French Pat. 771,746. Other processes of preparation also are well know, as for example, those methods illustrated by U.S. Pats. 2,127,476, 2,137,315, and 2,173,069. Similar to the tertiary amine, excellent results have been achieved with those quaternary ammonium halide salts and mixtures thereof having each of their radicals selected from the aforementioned group of radicals along with at least one long chain alkyl or alkenyl radical of from 8 to 28 carbon atoms in which the long-chain hydrocarbon radical is from a source material, such as the longer-chain natural or hydrogenated fatty acids. A partial listing of quaternary ammonium halide salts useful for practice of the invention includes: n-dodecyl trimethyl ammonium chloride, n-octadecyl trimethyl ammonium chloride, coconut fatty alkyl trimethyl ammonium chloride palmityl triethyl ammonium chloride, myristyl triethyl ammonium chloride, stearyl triethyl ammonium chloride, coconut fatty dialkyl dimethyl ammonium chloride, didauryl diethyl ammonium chloride, hexadecyl dimethyl benzyl ammonium chloride, n-dodecyl dimethyl benzyl ammonium chloride, stearic fatty alkyl dimethyl benzyl ammonium chloride, n-heptadecenyl dimethyl benzyl ammonium chloride, methyl stearyl diepoxyethylene ethanol ammonium chloride, benzyl lauryl diepoxyethylene ethanol ammonium chloride, n-hexadecyl diethanol benzyl ammonium chloride, n-dodecyl ethyl dibenzyl ammonium chloride, lauryl methyl dibenzyl ammonium chloride, methyl n-octyl diphenyl ammonium chloride, octyl diethyl benzyl ammonium chloride, octyl dimethyl benzyl ammonium chloride, lauryl dimethyl benzyl ammonium chloride, dodecyl diethyl methyl ammonium chloride, ethyl n-octyl diphenyl ammonium chloride, n-octyl tribenzyl ammonium chloride, lauryl diethyl phenylbenzyl ammonium chloride, dimethyl phenylbenzyl ammonium chloride, and their corresponding quaternary ammonium bromide and iodine salts, and the like.

It is preferred that the long-chain alkyl and alkenyl radical of the useful tertiary amines and quaternary ammonium halide salts to be fatty n-alkyl and n-alkenyl radicals from readily available fatty acids with such long-chain radical containing from 8 to 22 carbon atoms. For ready preparation of the tertiary amines and quaternary ammonium halide salts it is desirable that they contain therein no more than two long-chain radicals and that the other radicals be methyl, ethyl, benzyl, ethanol, and the other lower molecular weight radicals. It is desirable for optimum results that the tertiary amines be of a molecular weight of from about 200 to about 750 and that the quaternary ammonium halide salts be of a molecular weight of from about 225 to about 800.

The nonylphenoxy polyoxyethylene ethanol has a mol ratio of ethylene oxide to nonylphenol of from about 4:1 to about 50:1. Alternatively, such nonylphenoxy polyether alcohols are defined by the formula:

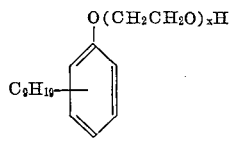

in which $x$ is an integer or from about 4 to about 50. The nonylphenoxy polyoxyethylene ethanols have average molecular weights between about 350 to about 2500. They vary from liquids for the lower molecular weight members to waxy-type solids for the higher molecular weight members. The lower molecular weight member (i.e. those of the smaller number of moles of ethylene oxide to nonylphenol) are more oil soluble than the higher molecular weight members, while the higher molecular weight members generally are more water soluble. The nonylphenoxy polyoxyethylene ethanols are nonionic and known as surface active agents, because of their detergent, wetting, emulsifying, and dispersing properties. They preferably are made by the direct reaction of ethylene oxide and nonylphenols. The reaction is well known with conditions therefor described in the published art. For example, 1-nonyl phenol (such as prepared by the Friedel and Crafts reaction of 1-nonyl chloride with phenol) is melted, about 1% by weight of 40% caustic dissolved therein, and while agitating the resulting mixture at about 130° C. there is passed therein ethylene oxide until the desired number of moles of ethylene oxide have been adsorbed by the nonylphenol. Excellent formable novolac compositions are obtained by employing p-(1-nonyl)phenoxy polyoxy-ethylene ethanols of average molecular weights between about 450 to 1300 in which the mol ratio of ethylene oxide to 1-nonylphenol is from about 6:1 to 25:1 with such compositions being preferred when optimum results are desired.

The polyoxyethylene glycol ester has an average of from 5 to 30 oxyethylene ($CH_2CH_2O$) groups and is esterified with an organic acid selected from the group consisting of monocarboxylic resin acids containing from 17 to 20 carbon atoms and monocarboxylic fatty acids containing from 10 to 24 carbon atoms. Excellent results are obtained with polyoxyethylene glycol esters of the straight chain saturated fatty acids and mixtures thereof in which the esters are monoesters (i.e. of a monoacylated structure having a terminal hydroxyl group) with such esters being preferred. It is relatively unimportant whether a single one of the suitable polyoxyethylene glycol esters or a mixture of the suitable polyoxyethylene glycol esters be employed, as substantially similar results are obtained. It also appears to be unimportant whether the polyoxyethylene glycol esters be of a mono- or diacylated structure and whether the resin and fatty acid structures contain some unsaturation, branched chains, and hydroxyl groups, as such polyoxyethylene glycol esters affect the novolac composition is such the same way. Excellent results are obtainable with the polyoxyethylene glycol esters having a molecular weight within the range of from 425 to 975 with these esters being preferred.

A number of these polyoxyethylene glycol esters are sold commercially as nonionic surface-active agents. For such purposes various manufacturers frequently describe the materials by differing terminology, such as oxyethylated fatty acid esters, polyethylene glycol esters of particular fatty acids, and polyoxyethylene glycol esters of various fatty acids or various vegetable oils. The polyoxyethylene glycol esters employed in the invention can be readily prepared by any of several well-known methods.

In one method a resin acid or fatty acid is esterified directly with a previously made polyoxyethylene glycol. Illustrations of such a preparation are taught in U.S. Pat. No. 2,275,494 and German Pat. No. 534,326. Polyoxyethylene glycols for use in such a preparation are prepared as is well known in the art by condensing ethylene oxide with itself to form the long-chain polyoxyethylene glycols. Polyoxyethylene glycols of a large number of different molecular weights are available commercially with generally those of a molecular weight over about 1200 being wax-like or solid in appearance. In such preparations of the polyoxyethylene glycol esters, there generally are obtained some diacylated glycol along with the monoacyl compound. In another method ethylene oxide, usually in the presence of a small amount of an alkaline catalyst, is reacted directly with the resin acid or fatty acid to yield the polyoxyethylene glycol ester with this preparation yielding only the monoacyl compound. By this technique the resulting polyoxyethylene glycol ester is obtained in a range of chain lengths which are usually specified in terms of the average number of moles of ethylene oxide reacted per mole of the acid. Such a preparation and conditions therefor are well known as illustrated by Industrial Engineering Chemistry, 46, 1930–4, 1954, as well as elsewhere in published art.

Monocarboxylic resin acids for preparation of the polyoxyethylene glycol esters are the various organic acids found free and found also in the form of esters in natural resins. For example, levopimaric acid is a primary constituent of pine oleoresin and under the influence of various acids isomerizes to provide abietic acid. Abietic acid also is obtainable by treatment of American pine rosin with concentrated boiling acetic acid. Levopimaric acid and d-pimaric acid are obtainable from the semisolid resin of cluster pine (*Pinus maritima, P. pinaster*) and podocarpic acid is the chief constituent of the resin of the Javanese and New England *Podocarpus cupressinus* and *P. dacrydiodes*. Such resin acids generally may be regarded as diterpenes ($C_{20}H_{30}O_2$) and diterpene derivatives. For example, abietic acid is of the diterpene formula $C_{20}H_{30}O_2$, and podocarpic acid having only 17 carbon atoms may be regarded as a degraded diterpene derivative.

The bulk of today's commercially available fatty acids are obtained from those natural plant and animal products composed mainly of higher fatty acid esters, although some synthetic fatty acids may be prepared from suitable petroleum fractions. Plant and animal fats and oil generally comprise up to about 90 percent fatty acid glycerides, which upon hydrolysis readily yield component fatty acids as their inorganic salts, which upon subsequent acid treatment thereof liberate the fatty acids. Normal or straight-chain saturated fatty acids are of major utility and importance for preparation of the polyoxyethylene glycol esters employed in the invention, although unsaturated fatty acids containing from one to several double bonds, hydrogenated unsaturated fatty acids, fatty acids containing a branched chain, and mixtures of such resin and fatty acids also are useful for preparation of the polyoxyethylene glycol esters employed in the invention.

In most instances resin acids and fatty acids from such natural materials are in the form of mixtures of several acids. For example, a mixture of palmitic and stearic acid may be obtained from tallow, and a mixture of resin acids abietic and neobietic acids generally in equal proportions, and fatty acids, mainly the $C_{18}$ unsaturated fatty acids, may be obtained from tall oil. There follows a brief partial listing of some of the more important resin acids and fatty acids which are suitable for preparation of the polyoxyethylene glycol esters: abietic acid (sylvic acid); levopimaric acid; d-pimaric acid; podocarpic acid; lauric acid; myristic acid; palmitic acid; stearic acid; oleic acid; linoleic acid; linolenic acid; rincinoleic acid; and mixtures thereof.

In most preparations of the polyoxyethylene glycol esters there will be obtained a mixture of several of the esters in which the various component esters differ in at least one or more respects in regards to the number of oxyethylene groups per mol of acid radical, in regards to the particular acid radicals, and/or in regards to whether they are mono- or diacylated glycol structures. Such mixtures of the polyoxyethylene glycol esters are useful in the invention. If desired, only a single polyoxyethylene glycol ester may be employed, although there is relatively little reason for such an expedient since the various polyoxyethylene glycol esters affect the foamable novolac composition in much the same way.

The water-soluble salt of a substituted benzoyl sulfopropionic acid ester is of the formula

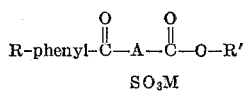

containing from 18 to 45 carbon atoms in which: R-phenyl is a substituted phenyl radical having a hydrocarbon radical substituent selected from the group consisting of the phenyl radical, the cyclohexyl radical, and alkyl radicals of from 1 to 15 carbon atoms; R' is a radical containing up to 20 carbon atoms selected from the group consisting of alkyl radicals, the phenyl radical, the cyclohexyl radical, and the $(CH_2CH_2O)_xH$ radical, wherein $x$ is a whole number integer; A is the ethylene radical; and M is a cation selected from the group consisting of sodium, potassium, and ammonium cations. In this salts, the $-SO_3M$ group may be attached to either of the carbons of the ethylene group. The usual modes of preparation provide a mixture rather than the pure alpha and beta derivatives with alpha and beta derivatives and also mixtures thereof all being useful for purposes of the invention.

The water-soluble salts of the substituted benzoyl sulfopropionic acid ester have excellent surfactant properties. They are known in the art as anionic surface-active agents with a number of these salts available commercially. Methods of their preparation are known and described in the published art. A preferred method of preparation is to condense maleic anhydride with a substituted benzene in a Friedel-Crafts reaction to obtain a substituted benzoyl acrylic acid which is esterified and then sulfonated by reacting the resulting ester with an appropriate sulfonating agent, such as $NaHSO_3$ or $NH_4HSO_4$. Disclosures of a number of suitable known water-soluble salts of substituted benzoyl sulfopropionic acid esters and a method for their preparation are found in U.S. Pats. Nos. 2,548,017, 2,548,018, 2,548,019, 2,548,020, and 2,548,021. A description of surface-active properties of such compounds may be found in "Industrial and Engineering Chemistry," 44, 314–17, February 1952.

Excellent foamable novolac compositions are obtained by employing the water-soluble salts of the aforedefined substituted benzoyl sulfopropionic acid esters which contain from 20 to 30 carbon atoms. The compositions containing these particular salts are preferred.

The ammonium salt of the acid sulfate of an hydroxyl-containing compound is one wherein the hydroxyl-containing compound is selected from the group consisting of alkyl carbinols containing from 8 to 18 carbon atoms, alkyl-substituted phenols containing from 10 to 24 carbon atoms, alkyl-substituted napthols containing from 12 to 22 carbon atoms, and the oxyethylene ether hydroxyl derivatives of these carbinols, phenols, and napthols which contain from 1 to 15 oxyethylene units and a terminal hydroxyl group. The ammonium salts also are definable by the formulae $ROSO_3NH_4$ and $$R(OCH_2CH_2)_nOSO_3NH_4$$

in which $n$ is a whole number integer of from 1 to 15 and in which R is a hydrocarbon radical selected from the group consisting of alkyl radicals containing from 8 to 18 carbon atoms, alkyl-substituted phenyl radicals in which the alkyl portion contains from 4 to 18 carbon atoms, and alkyl-substituted napthyl radicals in which the alkyl portion contains from 2 to 12 carbon atoms. The alkyl radical and alkyl portions of said substituted phenyl and napthyl radicals preferably are straight-chain alkyl although branched-chain alkyls are operative and useful.

The useful ammonium salts are anionic surface-active agents because of their detergent, wetting emulsifying, and dispersing properties. A number of these ammonium salts are available commercially. Useful ammonium salts also may be prepared by various well known reactions. For example, long-chain alkyl carbinols of the requisite number of carbon atoms, such as obtainable by hydrogenating suitable glycerides at high pressures and elevated temperatures in the presence of a catalyst such as copper chromite, may be treated with concentrated sulfuric acid to form the alkylsulfuric acid and then further treated with ammonia to yield the corresponding ammonium salt. Reaction conditions for such an ammonium salt formation are illustrated in Italian Patent No. 442,008. Alternatively, useful ammonium salts may be prepared by reacting such long-chain carbinols with sulfamic acid at elevated temperatures. In a similar manner such fatty alcohols may be heated with ammonium acid sulfate to sulfonate and form the ammonium salt, as illustrated in U.S. Pat. No. 2,150,557. Ethylene oxide reacts readily with alkyl carbinols, which have an active hydrogen, to form the oxyethylene ether hydroxyl derivatives of the carbinols. Generally such a reaction is carried forth in the presence of an alkaline catalyst such as taught by German Pat. No. 534,326. By subsequent treatment of oxyethylene ether hydroxyl derivatives of such carbinols in a manner generally similar to the treatment of the alkyl carbinols, one prepares the ammonium salts of the acid sulfate of the oxyethylene derivatives. The ammonium salts of the acid sulfate of the alkylphenol and the alkylnaphthol compounds also may be prepared generally in the same way as described above for preparation of the corresponding ammonium salts of the alkyl carbinols and the oxyethylene ether hydroxyl derivatives of such alkyl carbinols. Illustrative of such ways are the methods taught in French Pat. No. 790,447 and U.S. Pats. 2,075,018, 2,143,759, and 2,178,829. One has a choice of several manners of preparation for the ammonium salts of the acid sulfate of such alkylaryl hydroxy compounds. For example, it is possible to react ethylene oxide with an alkylphenol or to alkylate a phenoxyethyl alcohol and then treat resulting alkylphenoxyethyl alcohols from either in a manner well known in the art to prepare their acid sulfates and ammonium salts thereof. A convenient preparation for some of the useful ammonium salts is to chlorinate $C_{10}$ to $C_{12}$ petroleum distillates which then are condensed with an aromatic compound, such as phenol, in the presence of a suitable catalyst by a Friedel-Crafts type reaction to prepare alkylphenols. These alkylphenols then are sulfonated and neutralized to form the ammonium salts, with such a method generally illustrated in U.S. Pat. 2,233,408. Another useful method is to react butane sultone with an alkylphenol, as taught in U.S. Pat. No. 2,667,506, to form the acid sulfate, which then may be neutralized to form the ammonium salt. In many of the aforedescribed and well known methods of preparation the source of the alkyl in the resulting ammonium salts are mixtures of commercial fatty matrials or petroleum distillates. As a consequence, the resulting ammonium salts seldom consist of only a single salt, but more generally are mixtures of at least several of the requisite ammonium salts. Mixtures of such ammonium salts may be employed in the compositions of the invention. In general the useful ammonium salts have a molecular weight between about 225 to 1100, with those salts of a molecular weight between 250 to 700 being preferred.

A preferred foamable composition according to the invention also includes, with 80 parts of the novolac, from about ½ part to about 10 parts of a blowing agent which is effective, at the temperatures encountered during a desired curing reaction between the novolac and the curing agent, to generate a gas within the composition before cure is effected. When a blowing agent is used which includes both active and inert constituents, from ½ part to 10 parts of active constituents should be employed. Novolac resins and foamable compositions comprising novolac resins are hygroscopic in nature and tend to pick up moisture upon standing. It has been found that such moisture to the extent of from about ½ part to about 2½ parts, per 80 parts of the novolac, is advantageous, and acts as a blowing agent.

The terms "percent" and "parts" are used herein, and in the appended claims, to refer to percent and parts by weight, unless otherwise indicated.

The identity of the novolac resin which is one of the constituents of a foamable composition according to the invention is relatively unimportant, so long as the novolac is one which is curable to a thermoset condition, and can be incorporated in a foamable composition by a desired technique as subsequently discussed in more detail. It is necessary, therefore, that the novolac be produced from reactants which include at least some of a trifunctional phenol. The most common suitable novolacs are acid condensed, fusible, products of reaction of formaldehyde and phenol in ratios of from about ½ mol to about 1 mol of the former per mol of the latter, and corresponding products where furfural or acrolein have been substituted for at least a part of the formaldehyde. A novolac is essentially insoluble in water, but soluble in some organic solvents, e.g., in alcohols. A foamable composition according to the invention is, therefore, essentially anhydrous, but can be either a solid or a solution or dispersion in an organic solvent. A detailed discussion of novolacs can be found in The Chemistry of Phenolic Reins, Robert W. Martin, John Wiley & Sons, Inc., New York, N.Y., 1956 (see, in particular, pp. 99–112, and cited references).

As has been indicated above, a foamable composition according to the invention also includes a curing agent for the novolac. Hexamethylenetetramine and paraformaldehyde are suitable curing agents which are frequently used with novolacs. However, any other known suitable curing agent, for example a resole, a thermosettable urea formaldehyde material, or the like, can also be employed. Excellent results have been achieved using from about 5 parts to about 20 parts of hexamethylenetetramine with 80 parts of the novolac. An equivalent proportion of paraformaldehyde or other suitable curing agent can be substituted for the hexamethylenetetramine, but optimum foamed products are produced when the curing agent employed is one which, like hexamethylenetetramine, does not form water of condensation when it reacts with a novolac. Paraformaldehyde produces water of condensation during the course of reaction with a novolac, and, therefore, is a less desirable curing agent than hexamethylenetetramine.

Both water of condensation, which is produced by paraformaldehyde, and nitrogenous gases of condensation, principally nitrogen and ammonia, as formed by hexamethylenetetramine, constitute blowing agents which are effective to cause expansion into a cellular structure of a composition according to the invention. However, as is indicated above, an additional blowing agent is preferably also employed in such a composition. It has been found that the blowing action of a curing agent is usually insufficient in extent to enable the production of low density foams, for example, foams having apparent densities less than about 5 pounds per cubic foot. Since the cost of the novolac which is foamed is a significant part of the total cost of a foamed product according to the invention, it is economically advantageous to produce low density foams, and, therefore, such a foamable composition preferably includes a sufficient amount of a blowing agent to supplement the blowing action of the curing agent and enable the production of a low density foam.

To be effective to supplement the action of hexamethylenetetramine or other curing agent in producing a low density foam according to the invention, a blowing agent must be one which is comparatively stable at temperatures below, and often comparatively near, the temperature range within which the novolac cures rapidly, and which vaporizes or decomposes and forms a gaseous decomposition product at the temperatures encountered during a desired curing reaction, but before cure is effected. It will be appreciated that any of many known blowing agents can be used for this purpose, and that the specific identity of the blowing agent is relatively unimportant so long as its vaporization or decomposition occurs at a temperature which is appropriate for the particular novolac being foamed. In most cases, the blowing agent should be one which is effective to release a gas at temperatures within the range of 65° C. to 250° C. Excellent results have been achieved using between about ½ part and about 10 parts of dinitrosopentamethylenetetramine in a foamable composition containing 80 parts of a particular novolac. It will be understood that the cure of a novolac, in the presence of a curing agent, will proceed at an extremely slow rate at some given temperature, and at progressively increasing rates at high temperatures. The curing reaction is, therefore, a time-temperature phenomenon which can be made to proceed to a desired extent at any of a number of temperatures, provided that a proper time interval at the selected temperature is provided. The rate at which cure proceeds at any given temperature depends upon many factors, including the specific identity of the novolac, the amount and identity of the curing agent available for reaction therewith, the pressure to which the composition is subjected, and various other factors. While, as has been indicated above, the specific identity of the blowing agent used is of only minor importance, the agent must be effective in the particular composition with which it is used, and under the blowing and curing conditions employed. For example, any blowing gas generated either before the novolac-containing composition is fused, or after curing to an infusible condition has occurred, is wasted. The blowing agent used must be one which releases the desired or required quantity of a blowing gas while the composition is being fused under the particular curing conditions employed. Since the release of a blowing gas by a blowing agent is, like the cure of the novolac, a time-temperature phenomenon, the heating cycle used to effect blowing and curing can be varied within substantial limits to adapt the blowing action of a particular agent to the fusing and curing characteristics of a particular composition. Instead of the ½ part to 10 parts of dinitroso-pentamethylenetetramine, various other known blowing agents, within the same range of proportions, can be used in a composition according to the invention, as indicated in the following table:

| Blowing agent: | Effective temperature range ° C. |
|---|---|
| Azobisisobutyronitrile | 105–120 |
| Azo dicarbonamide 1,1-azobisformamide | 100–200 |
| Benzenesulfonyl hydrazide | 95–100 |
| N,N' - dinitroso-N,N'-dimethyl terephthalamide | 65–130 |
| Dinitrosopentamethylenetetramine | 130–190 |
| Ammonium carbonate | 58 |
| p,p'-oxybis-(benzenesulfonylhydrazide) | 100–200 |
| Diazonaminobenzene | 84 |
| Urea-biuret mixture | 90–140 |
| 2,2'-azo-isoburytro-nitrile | 90–140 |
| Azo hexahydrobenzo-nitrile | 90–140 |
| Diisobutylene | 103 |
| 4,4'-diphenyl disulfonylazide | 110–130 |

As has previously been stated, a foamable composition according to the invention comprises from about 0.2 to about 10 parts of the effective hydrogen bonding surface-active agent. It has been found that the use of such an effective agent, and in the stated range, has a noteworthy affect upon compressive strength of the cured foam which is produced. In addition, the effective agent has a marked affect upon cell size and the ability of a composition to expand, enabling the production of cured, low density foams composed of a plurality of small and comparatively uniform cells. The stabilizing agent must be one which hydrogen bonds to the labile hydrogen of the polymeric material and does not react therewith. This belief is supported by the observation that any of several known reactive surface active agents, for example, lauryl sodium sulfate, cetyl betaine, N-methyl and N-ethyl morpholines, low molecular weight, tertiary amines, high molecular weight aliphatic amine acetates, pentaerythritol, isooctyl phenoxy polyoxyethylene ethanol, polyoxyethylene glycols, polyoxyethylene glycol esters having about 4 mols of ethylene oxide per mol of acid, isopropyl naphthalene sodium sulfonate, sodium salts of the acid sulfates of other alkyl carbinols, alkyl-substituted phenols, alkyl-substituted naphthols, and their oxyethylene ether hydroxyl derivatives, when substituted for the effective hydrogen bonding surface active agent produced a cured foam having a cell structure similar to that produced when no stabilizing agent is used. Cured foams achievable with the effective hydrogen bonding surface active agent of the invention, however, have very small and uniform cells of a size of less than 10 mils and usually within the range of about 1–4 mils. By comparison, the cured foams of the novolac compositions containing lauryl sodium sulfate and the other agents listed therewith have comparatively nonuniform and larger cells, generally ranging in size from 60 to 250 mils. Although the system is essentially anhydrous, lauryl sodium sulfate and the other listed reactive agents react with the resin, at least to some degree so that they do not retard the thickening of the resin when heated. In addition the reactive agents do not break loose from the resin molecules at elevated temperatures, so that the reactive agents affect the strength of the foams produced herewith.

Various materials other than a novolac, a curing agent therefor, a blowing agent and one of the indicated effective hydrogen bonding surface active agents can be incorporated in a foamable composition according to the invention. For example, ammonium formate, ammonium benzoate, ammonium lactate, ammonium molybdate, ammonium borate, ammonium carbonate and ammonium acetate have all been used to facilitate blowing, to control cell size, to mask a comparatively unpleasant odor which is attributed to decomposition of hexamethylenetetramine, when used as a curing agent, or for other similar purposes. Ammonium salts of acids weaker than acetic acid are preferred for this purpose over such salts of acetic or stronger acids because of their less corrosive nature. Acids of relatively low vapor pressure also are useful to combat disagreeable odor in cured foams from curing the novolac with such nitrogen-containing curing agents as hexamethylenetetramine, trimethylene tetramine or the like. With such curing agents, apparently the produced foams contain minute amounts of methyl amines or other odoriferous by-products which can react with the acid to yield substantially odor-free products in amounts not detrimental to the foams. Of course, the suitable acids and their reaction products with such odoriferous by-products do not carry disagreeable odor. Extremely useful because of their relatively low corrosive nature are weak acids, such as boric acid, phthalic acid, benzoic acid, salicylic acid, and the like. Numerous other acidic materials and acids, for example phthalic anhydride, alkenyl substituted phthalic anhydrides, oxalic acid, adipic acid, succinic acid, phenol disulfonic acid, maphthol sulfonic acids, naphthylamine sulfonic acids, sulfanilic acid, stearic acid, and the like, also may be used. The acid, generally admixed with the foamable composition just prior to or shortly after the admixing of the nitrogen-containing curing agent, is added in a small amount, preferably an amount substantially the theoretical acid equivalent of that required to neutralize all ammonia capable of liberation from all of the nitrogen in the nitrogen-containing curing agent. Other materials can be used similarly to mask such odor, or for other specific purposes, as will be apparent to one skilled in the art.

In producing a foamable composition according to the invention, thorough mixing to achieve uniformity is important. Since the novolac, at room temperature, is usually a fusible solid from which a solution or dispersion can be formed with a suitable organic solvent, hot mixing of a molten novolac at room or other temperature mixing of a novolac solution or dispersion with other required constituents to produce a foamable composition according to the invention, is a suitable method. However, a fused novolac has an extremely high viscosity at all temperatures sufficiently low that curing thereof does not proceed at a comparatively high rate, and it is preferable to avoid any substantial amount of a solvent or dispersing medium when an unreinforced foam is to be produced. It has been found that a novolac can be fused, mixed, while fused, with all other required constituents which are neither affected by the temperature of the unused novolac nor reactive therewith to a significant extent at such temperature during the time required for mixing, to form a uniform dispersion of such constituents in the novolac. The uniform dispersion can then be cooled to solidify the novolac, and the resulting solid mixture crushed or otherwise comminuted to a particle size of about 100 mesh, U.S. Sieve Series, or finer. Hexamethylenetetramine or other curing agent for the novolac, and any other temperature sensitive constituents of the foamable composition, in a similarly comminuted condition, can then be dry blended with the powdered solid suspension, for example by tumbling, to produce the desired foamable composition. The hexamethylenetetramine or other curing agent and any other temperature sensitive constituent of the foamable composition can also be mixed with the fused composition, provided that thorough mixing is accomplished rapidly and the resulting mixture cooled before significant reaction or decomposition occurs. The complete hot mix can be knife-coated, roller-coated or otherwise applied to a suitable carrier sheet while in a fused condition, and cooled, or can be cooled and comminuted preferably to about 40 mesh or finer, U.S. Sieve Series.

A foamable, novolac-containing composition according to the invention can be converted to an expanded, cellular, cured condition from a thin solid film, usually on a suitable carrier sheet such as kraft-, glassine, glass fiber-, glass flake-, or other suitable paper, cellophane, polyester film, polyethylene film, saran film, glass fiber mat, glass fiber fabric, or the like. Such conversion can also be accomplished by a powder of the foamable composition on such carrier, or in a suitable mold, or admixed with fibers. Suitable fibers have sufficient heat resistance to withstand the temperatures for foaming and curing the novolac composition, and include both natural and synthetic, organic and inorganic fibers, such as glass textile fibers, glass wool, excelsior, asbestos, fibers, cotton fibers, wool fibers, nylon fibers, and the like. In addition, at least when a foam reinforced with glass or other suitable fibers is to be produced, a solution or dispersion, in a suitable organic solvent, of the foamable composition can similarly be foamed. In any case, the composition must be heated, at least to initiate exothermic reaction between the novolac and the curing agent, and usually also to complete such reaction. Which of the previously discussed methods for producing a foamable composition according to the invention is preferred in a particular instance depends upon the processing technique by which a cellular, cured article is to be produced. For example, when this conversion is to be carried out from a thin film on a suitable carrier, hot mixing of the several ingredients of the composition, and in the absence of any solvent or dispersing medium, is preferred. When the foamable composition is to be processed from a powdered condition, either in a suitable mold or on an appropriate carrier, the powder can be produced in either of the previously discussed ways. When it is desired to introduce a foamable, novolac-containing composition according to the invention into the interior of a mass of intermeshed glass or other similar fibers, it is usually preferred to use a solution or dispersion of the novolac and other constituents of the composition in a suitable organic solvent.

The following examples describe the production of specific novolacs, the formulation of foamable compositions containing the novolacs, and the conversion of the resulting foamable compositions to expanded, cured conditions, in which they constitute articles useful as low temperature thermal insulating materials.

EXAMPLE 1

A novolac was produced in a jacketed, 10 gallon glass-lined kettle fitted with an anchor-type agitator, a thermometer and a reflux condenser from a charge of 20.29 kilograms U.S.P. phenol, 12.95 kilograms of 37 percent formalin (a 37 percent solution of formaldehyde in water) and 0.1 kilogram of oxalic acid. The phenol and the formaldehyde were mixed at about 40° C. in the reaction kettle, and the oxalic acid, in a granular condition, was added. The agitator was driven to accomplish this mixing, and was continued until reaction between the phenol and the formaldehyde was substantially complete, and a novolac had been formed. Water at a temperature of about 50° F. was also circulated through the jacket of the reflux condenser from the beginning of the mixing operation until substantial completion of the reaction between the phenol and formaldehyde and production of the novolac. The kettle was then heated by circulating low pressure steam through the jacket to bring the reaction mixture to a temperature ranging from 94° C. to 96° C., and water or steam was then used, as required, to maintain the reaction mixture at a temperature within such range for a period of 6½ hours. Agitation of the reaction products in the kettle was then stopped, and the reaction products were allowed to stand for about 1 hour. During this time a phase separation occurred, an aqueous layer rising to the top, and an organic layer collecting in the bottom of the kettle. The aqueous top layer was then siphoned from the kettle; agitation was resumed; and steam was introduced into the jacket of the kettle to bring the reaction products to a temperature of approximately 120° C. in a period of about 2½ hours. The reaction products were maintained at about 120° C. by suitable adjustment of the flow of steam to the kettle jacket, while gases and vapors were exhausted from the upper portion of the kettle to decrease the pressure therein gradually, over a period of about 15 minutes, until a vacuum of 28″ of mercury was reached, and for an additional hour while a vacuum of about 28″ mercury was maintained. The vacuum in the kettle was then released, and a 7.7 kilogram portion of the novolac which was contained therein was transferred to a 10 gallon mixing vessel, while the remainder thereof was discharged into shallow pans and allowed to cool to room temperature, at which temperature it was found to be a hard, brittle solid. The novolac was then removed from the pans and broken into relatively large lumps.

The following ingredients were added to the 7.7 kilogram portion of the novolac in the mixing vessel, while the novolac was at a temperature of substantially 110° C.: 200 grams of a polyoxyethylene sorbitan mono-palmitate,[1] 500 grams of ammonium acetate and 500 grams of diisobutylene. These ingredients were mixed thoroughly by means of a motor driven, propeller-type agitator, and the resulting uniform mixture was then cast into shallow pans and allowed to cool. After the mixture had cooled in the pans, hard, brittle lumps thereof were broken from the pans, crushed, and finally ground in a jar mill. Periodically, the mixture in the jar mill was subjected to a screening operation. Portions of the mixture which passed through a 100 mesh sieve, U.S. Sieve Series, were collected for subsequent use in producing a foamable composition, while portions thereof which remained on the 100 mesh sieve were returned to the jar, with additional make-up lumps which had not previously been ground, for further comminution. A charge of 89 parts of the minus 100 mesh mixture, 10 parts of minus 100 mesh hexamethylenetetramine and 4 parts of minus 100 mesh dinitroso-pentamethylenetetramine was then placed in a drum and intimately mixed by tumbling. The tumbling was accomplished by rotating the drum about its longitudinal axis at a rate of about 40 revolutions per minute for 30 minutes. The resulting admixture was a foamable, curable, novolac-containing composition.

Phenolic bodies in a cellular or expanded condition were then produced from the minus 100 mesh composition by placing five charges thereof ranging from 52 grams to 55 grams on kraft paper sheets positioned in the bottom of an open-topped mold cavity approximately 6″ x 6″ x 2″, placing a second kraft sheet over the open 6″ x 6″ top of the mold cavity, and then pressing a flat platen over the top sheet of kraft paper and the open top of the mold cavity and heating the powder to a temperature of about 360° F. The heating has been accomplished by circulating steam through suitable jacketing of the mold and top platen, and also dielectrically. Each of the charges in the closed mold cavity was maintained at about 360° F. for approximately 30 minutes, and was then removed therefrom in the form of a cured, cellular phenolic body with a kraft paper skin on each of its major surfaces. The average apparent density in pounds per cubic foot of the products was 2.69; the vapor permeability in perms[2] ranged from 1 to 3; and the average proportional elastic limit[3] was 1019 pounds per square foot, while an average compressive force of 2358 pounds per square foot was required to cause a 10 percent compression of the foam. Various other foams of different apparent densities can also be produced from the foamable composition. The grams of the foamable composition to be charged to the indicated mold, and approximately the properties of the finished product that can be made, are presented in the following table:

| Grams of foamable composition charged | Apparent density in lbs. per cubic ft. | K value, B.t.u. per hour per square foot, per inch thickness, per ° F. | Compressive force, in lbs. per sq. ft., required to cause a 10% compression | Elastic limit |
|---|---|---|---|---|
| 31 | 1½ | ¼ | 500 | 350 |
| 49 | 2½ | ¼ | 900 | 625 |
| 70 | 3½ | ¼ | 2,400 | 1,225 |
| 87 | 4½ | ¼ | 3,600 | 1,725 |
| 85 | 4¼ | ¼ | 4,100 | 2,525 |
| 100 | 5 | ¼ | 4,300 | 3,600 |

N.B.—In all cases, the cured, cellular, phenolic products had small uniform cells, ranging from about 3 to 4 mils in size, and vapor permeability ranging from 1 to 3 perms.

When, for purposes of comparison, but not in accordance with the invention, the procedure described above was repeated to produce a cured, cellular, phenolic mate-

---

[1] The mol ratio of ethylene oxide to sorbitan monopalmitate was 20:1, and the material was produced from ethylene oxide and the monoester, as discussed above.

[2] Vapor permeability, is perms, of a cellular material, is the number of grains of water trasnmitted through a body thereof, per square foot of surface area, per hour, per inch of mercury pressure.

[3] The "elastic limit" of a foam is, herein, and in the art, the maximum compressive force that foam will withstand and still return to its original thickness when the force is released, and is expressed in pounds per square foot.

rial, except that the same weight of lauryl sodium sulfate was substituted for the polyoxyethylene sorbitan monopalmitate, the cellular material which was produced had large cells, varying widely in size, had an apparent density of 5.27 pounds per cubic foot, and had an elastic limit of only 3025 pounds per square foot. A small charge of the foamable composition would not fill the mold, so that a low density material could not be produced.

The apparatus shown in FIG. 1 of the drawings can also be used to produce a phenolic body in a cellular or expanded condition from the minus 100 mesh composition produced as described above. The minus 100 mesh material is charged into a hopper 10 provided with a vibrator 11 to control feeding of the material from the hopper onto a suitable support sheet 12. The support 12 is fed from a supply roll 13 over a guide roll 14, a flat support member 15, a support roll 16, and onto a suitably driven conveyor belt 17 carried by rolls 18 and 19. The minus 100 mesh foamable material, designated 20, is distributed in a uniform layer on the support sheet 12, and is advanced therewith into a suitably heated oven, which is designated generally at 21. An upper support sheet 22 is also fed from a suitable supply roll 23, under a guide roll 24, and into the oven 21 in spaced, generally parallel relationship with the sheet 12. Within the oven 21, the foamable material 20 is heated to a temperature of about 260° F., which heating initiates reaction between the hexamethylenetetramine and the novolac, and also causes evolution of gases by the dinitrosopentamethylenetetramine. The combined effect of the gases given off by the dinitrosopentamethylene-tetramine and of nitrogen gases given off as an incident to the curing reaction between the hexamethylenetetramine and the novolac is to expand the composition into a cellular structure, as indicated at 25, and to force the support sheet 22 against a suitably driven conveyor belt 26, which is mounted between rolls 27 and 28. The speeds of the conveyor belts 17 and 26 are substantially identical, and are such that each particle of the novolac has a residence time within the oven 21 of about 30 minutes. The resulting product, designated 29, is composed of a cured, thermoset novolac, in a cellular structure, and with the support sheets 12 and 22 adhered to the lower and upper surface thereof, respectively. By varying the weight of the foamable material 20 applied, per square foot of the support sheet 12, products varying in apparent density of from ½ to 10 pounds per cubic foot can be produced. Higher density foams can also be produced, but are desirable only for special applications, for example as moldings.

EXAMPLE 2

The novolac produced as described in the first paragraph of Example 1 has also been used to produce a cured, cellular, phenolic body by a modified method. In this case, the foamable composition was produced in a jacketed mixing vessel by charging thereto 77 parts by weight of the lump novolac, introducing steam into the jacket of the vessel to fuse the novolac and bring it to a temperature of about 110° C., and then adding to the fused novolac 5 parts by weight of diisobutylene, 5 parts by weight of ammonium acetate, 2 parts by weight of the polyoxyethylene sorbitan monopalmitate, 4 parts by weight of dinotrosopentamethylene-tetramine and 10 parts by weight of hexamethylenetetramine, and rapidly but thoroughly mixing the resulting charge with a motor driven, propeller-type agitator to effect uniformity. A part of the resulting viscous liquid fomable composition was knife coated onto sheets of kraft paper approximately 6″ square, to a thickness of about ¾ gram per square inch, and the remainder thereof was poured into shallow pans and cooled rapidly. After the foamable novolac composition coating on the kraft paper sheets had cooled and solidified, two of the coated sheets were stacked together, with the novolac-coated sides adjacent one another, placed in the previously described mold, and, after the flat platen had been placed over the open mold top, heated to bring the foamable novolac composition to a temperature of about 360° F., and to keep the novolac composition at approximately such temperature for about 30 minutes. The flat platen was then removed, and a cured, expanded, phenolic material, adhered to the kraft paper sheets, was removed from the mold. This material was substantially identical with that previously described in Example 1, having an apparent density of 2.85 pounds per cubic foot, a vapor permeability of from 1 to 3 perms, and compressive and thermal properties as set forth above for a material of the corresponding density.

Cured, expanded, cellular bodies have also been produced from a solidified mass of the foamable composition produced as described in this example, after comminution to a particle size of about 40 mesh or finer, U.S. Sieve Series, by generally the method previously described in Example 1. The resulting products have had essentially the same properties, as a function of apparent density, as set forth in the foregoing table. Such procedures constitute the best presently known mode for practicing the instant invention because more effective mixing is achieved than by the drypowder mixing technique described in Example 1, and because control over quantity of the foamable composition is easier than when knife-, roller-, or other- coating techniques are fused to spread, foamable, novolac composition on a suitable carrier.

A cured, cellular, phenolic body can also be produced by charging a fused, foamable, novolac composition into hoppers 30 and 31, shown in FIG. 2 of the attached drawings, and flowing the composition onto support sheets 32 and 33 fed, respectively, from supply rolls 34 and 35. The support sheet 32 is passed over rolls 36 and 37, and into an oven indicated generally at 38. The support sheet 33 is passed over or around rolls 39, 40 and 41, and into the oven 38 in spaced, generally parallel relationship with the sheet 32. The foamable composition flows onto the sheet 32 at a point where the sheet is passing over a stationary support 42, and is spread into a thin, uniform layer by a doctor blade 43. The foamable composition flows onto the support sheet 32 at a point where the sheet is supported by a stationary support 44, and is spread into a thin, uniform layer by a doctor blade 45. If desired, roller coaters can be used instead of the doctor blades 43 and 45. The thin layer of the foamable composition on the support sheets 32 and 33 is designated 46. In the oven 38, the foamable sheet 46 is heated to a temperature of about 350° F., sufficient to initiate reaction between the hexamethylenetetramine and the novolac, and also sufficient to cause the dinitrosopentamethylene-tetramine therein to evolve nitrogenous gases. The gas evolution within the oven 38, as previously described, in connection with FIG. 1, causes expansion of the foamable material 46, as designated generally at 47, so that the support sheets 32 and 33 are forced against conveyor belts 48 and 49, as also previously discussed in connection with FIG. 1. A cured, expanded, phenolic material, adhered to the support sheets 32 and 33, is produced. This material, which is designated 50, is substantially identical with that designated 29 in FIG. 1, and has properties which depend upon its apparent density, as set forth in the foregoing table.

The experimental procedures described above have also been carried out, with similar results, but using other polyoxyethylene sorbitan monoesters. For example, a polyoxyethylene sorbitan monolaurate produced from ethylene oxide and the monoester, as described above, in a mol ratio of 4:1, and a polyoxyethylene sorbitan monooleate produced from ethylene oxide and the monoester, in a mol ratio of 5:1 have both been used.

Similar results have also been achieved using various commercially available novolacs.

EXAMPLE 3

A foamable, curable, novolac-containing composition was produced according to the procedure of the second paragraph of Example 1, using a novolac produced according to the first paragraph of Example 1 but with 200 grams of a mixture of 4-substituted derivatives of 2-alkyl substituted 2-oxazoline compounds [4] substituted for the 200 grams of a polyoxyethylene sorbitan monopalmitate.

Five phenolic bodies were produced from this composition by the procedure set forth in the third paragraph of Example 1 but using a charge of approximately 40 grams rather than 52 to 55 grams of the foamable composition.

The average apparent density in pounds per cubic foot of the products was 2.0; the vapor permeability in perms ranged from 1 to 3; the K values averaged ¼ B.t.u. per hour per square foot, per inch of thickness, per degree Fahrenheit; and the product had very small and uniform cells of a size averaging about 3 to 4 mils with no cells larger than 10 mils being apparent. Various other foams of different apparent densities can also be produced from the foamable composition. For example, in a like manner, with a charge of 60 grams on a kraft paper sheet in the mold there is obtained a product having an apparent density in pounds per cubic foot of about 3.0. This product had a K value and a vapor permeability very close to those of the products employing the 40 gram charges, and also had very small and uniform cells with no cells of a size larger than 10 mils being apparent.

When, for purposes of comparison, but not in accordance with the invention, the procedure described above was repeated to produce a cured, cellular, phenolic material, except that the same weight of lauryl sodium sulfate was substituted for the mixture of 4-substituted derivatives of 2-alkyl substituted-2-oxazoline compounds, the cellular material which was produced was inferior to the cellular material produced from the corresponding compositions containing about the same weight of the oxazoline compound. A small charge of the foamable composition containing the lauryl sodium sulfate would not fill the mold, so that a low density cellular material could not be produced. Cellular materials which were produced had large cells, varying widely in size, with cells up to ¼ inch in size being apparent. In comparison to the oxazoline-novolac-containing composition, these cellular materials required higher charges to fill the mold, had higher apparent densities, lacked toughness, were more friable and less flexible, and had higher K values. When for purposes of comparison, but not in accordance with the invention, the procedure above was repeated except that in place of the mixture of 4-substituted derivatives of 2-alkyl substituted -2-oxazoline compounds there were substituted cetyl betaine, N-methyl morpholine, and N-ethyl morpholine, the cellular materials which were produced had similar inferior properties. Additionally, small charges of these foamable compositions would not fill the mold, so that low density cellular materials could not be produced.

EXAMPLE 4

The procedure of Example 2 was repeated except that two parts by weight of the mixture of 4-substituted derivatives of 2-alkyl substituted -2-oxazoline compounds were substituted for the 2 parts by weight of the polyoxyethylene sorbitan monopalmitate. The resulting material was substantially identical with that previously described in Example 3, having an apparent density of 2.7 pounds per cubic foot, a vapor permeability of from 1–3

---

[5] A mixture consisting essentially of 60% n-tetradecyl di-4-octanooxymethyl-2-oxazoline, 4% 2-nonyl-4-methyl-4-decanooxymethyl-2-oxazoline, and 2% 2-pentyl-4-methyl-4-hexanooxymethyl-2-oxazoline, which mixture was prepared by condensing 2-amino-2-methyl-1,3-propanediol and commercially pure caprylic acid until 3 moles of water formed. The commercially pure caprylic acid consisted essentially of 94% caprylic acid, 4% capric acid and 2% caproic acid.

perms, and strength and thermal properties very close to those of the cellular material of Example 3.

Cured, expanded, cellular bodies have also been produced from a solidified mass of the foamable composition produced as described in this example, after comminution to a particle size of about 40 mesh or finer, U.S. Sieve Series, by generally the method previously described in Example 1. The resulting products also had essentially the same properties, as the cellular material set forth in Example 3. Such procedures constitute the best presently known mode for practicing the instant invention because more effective mixing is achieved than by the dry powder mixing technique described in Example 1, and because control over quantity of the foamable composition is easier than when knife-, roller-, or other-coating techniques are used to spread a fused, foamable, novolac composition on a suitable carrier.

The experimental procedures described in Examples 3 and 4 may also be carried out, with similar results, but using other 2-substituted-2-oxazoline compounds and 4-substituted derivatives thereof of the afore defined formula. Using amounts of 2-phenyl-2-oxazoline, 2-heptadecyl-2-oxazoline, 2-phenyl-4-benzooxymethyl-2-oxazoline, 2-undecyl-4-lauroxymethyl-2-oxazoline, 2-heptadecyl - 4 - hydroxyethyl-2-oxazoline, and 2-heptadecyl-2-ethyl-2-oxazoline within the range of 0.2 part to 10 parts of the 2-oxazoline compound for each 80 parts of novolac in the compositions, there are obtained, by generally the aforedescribed methods, cellular materials of low apparent densities with very small and uniform cells of a size less than about 10 mils. The cellular materials produced were tougher, more flexible, less brittle, and of lower K value than comparative celluular materials produced from corresponding compositions having about the same weight of lauryl sodium sulfate or the like replacing the 2-oxazoline compound.

Similar results have also been achieved using various commercially available novolacs or commercially available 2-oxazoline compounds and derivatives thereof having the aforementioned requisite formula. For example, excellent results have been obtained with the 2-oxazoline compound sold under the name of Alkaterge C by Commerical Solvents Corporation, New York, N.Y.

EXAMPLE 5

A foamable, curable, novolac-containing composition was produced according to the procedure of the second paragraph of Example 1 using a novolac produced according to the first paragraph of Example 1, but with 200 grams of methyl 1 - (2 - hydroxyethyl)-2-n-heptadecyl-imidazolinium chloride substituted for the 200 grams of a polyoxyethylene sorbitan monopalmitate.

Five phenolic bodies in a cellular or expanded condition were then produced from the composition using the procedure of paragraph 3 of Example 1 but employing charges of about 40 grams rather than 52–55 grams. The average apparent density in pounds per cubic foot of the products was 2.0; the vapor permeability in perms ranged from 1 to 3; the K values averaged ¼ B.t.u. per hour per square foot, per inch of thickness, per degree Fahrenheit; and the products had very small and uniform cells of a size averaging about 3 to 4 mils with no cells larger than 10 mils being apparent. Various other foams of different apparent densities can also be produced from the foamable composition. For example, in a like manner, with a charge of 60 grams on a kraft paper sheet in the mold there is obtained a product having an apparent density in pounds per cubic foot of about 3.0. This product had a K value and a vapor permeability very close to those of the products employing the 40 gram charges, and also had very small and uniform cells with no cells of a size larger than 10 mils being apparent.

EXAMPLE 6

A cured, cellular, phenolic body has been made by the modified procedure of the first paragraph of Example 2 except that 2 parts by weight of the methyl 1-(2-hydroxyethyl)-2-n-heptadecyl-imidazolinium chloride chloride was substituted for the 2 parts by weight of the polyoxyethylene sorbitan monopalmitate. This material was substantially identical with that previously described in Example 5, having an apparent density of 2.7 pounds per cubic foot, a vapor permeability of from 1 to 3 perms, and strength and thermal properties very close to those of the cellular material of Example 5.

Cured, expanded, cellular bodies have also been produced from a solidified mass of the foamable composition produced as described in this example, after comminution to a particle size of about 40 mesh or finer, U.S. Sieve Series, by generally the method previously described in Example 1. The resulting products also had essentially the same properties as the cellular material set forth in Example 1.

The experimental procedures described in Examples 5 and 6 may also be carried out, with similar results, but using other cationic surface-active agents selected from the aforesaid requisite group consisting of certain imidazoline compounds and imidazolinium halide salts. Using amounts of methyl 1-(2-hydroxyethyl)-2-n-heptadecyl-imidazolinium iodide, methyl 1-(2-hydroxyethyl)-2-n-heptadecyl-imidazolinium bromide, 2-phenylimidazoline, 2-undecyl-imidazoline, and 2-pentadecyl-4-methyl-imidazoline within the range of 0.2 part to 10 parts for each 80 parts of novolac in the compositions, there are obtained, by generally the aforedescribed methods, cellular materials of low apparent densities with very small and uniform cells of a size less than about 10 mils. The cellular materials thus produced were tougher, more flexible, less brittle, and of lower K value than comparative cellular materials produced from corresponding compositions having about the same weight of lauryl sodium sulfate or the like replacing the agent employed in the invention.

Similar results have also been achieved using various commercially available novolacs or commercially available cationic surface-active agents selected from the aforesaid requisite group consisting of certain imidazoline compounds and imidazolinium halide salts. For example, excellent results have been obtained with the $C_{17}$-alkyl imidazolinium chloride sold under the name of Quaternary O by Geigy Industrial Chemicals, Yonkers, N.Y.

EXAMPLE 7

A foamable, curable, novolac-containing composition was produced according to the procedure of the second paragraph of Example 1, using a novolac produced according to the first paragraph of Example 1, but with 200 grams of a mixture of fatty n-alkyl dimethyl benzyl ammonium chlorides[5] substituted for the 200 grams of a polyoxyethylene sorbitan monopalmitate.

Five phenolic bodies in a cellular or expanded condition were then produced from the foamable composition using the procedure set forth in paragraph 3 of Example 1, but employing charges of approximately 40 grams. The average apparent density in pounds per cubic foot of the products was 2.0; the vapor permeability in perms ranged from 1 to 3; the K values averaged ¼ B.t.u. per hour per square foot per inch of thickness, per degree Fahrenheit; and the products had very small and uniform cells of a size averaging about 3 to 4 mils with no cells larger than 10 mils being apparent. Various other foams of different apparent densities can also be produced from the foamable composition. For example, in a like manner, with a charge of 60 grams on a kraft paper sheet in the mold there is obtained a product having an apparent density in pounds per cubic foot of about 3.0. This product had a K value and a vapor permeability very close to those of the products employing the 40 gram charges, and also had very small and uniform cells with no cells of a size larger than 10 mils being apparent.

When for purposes of comparison, but not in accordance with the invention, the procedure above was repeated except that in place of the cationic surface-active agent employed in the invention there were substituted triethyl amine and diethyl ethanol amine, the cellular materials which were produced had similar interior properties. With certain commercially available cationic surface-active agents, namely high molecular weight aliphatic amine acetates, such as "Armac T" of Armour Chemical Division, Chicago, Ill., the cellular materials had similar inferior properties. With certain commercially available cationic surface-active agents, namely high molecular weight aliphatic amine acetates, such as "Armac T" of Armour Chemical Division, Chicago, Ill., the cellular materials also had similar inferior properties. Additionally, small charges of such foamable compositions would not fill the mold, so that low density cellular materials were not produced.

EXAMPLE 8

A cured, cellular, phenolic body has been made by the modified procedure of the first paragraph of Example 2 except that two parts by weight of the mixture of fatty n-alkyl dimethyl benzoyl ammonium chlorides employed in Example 7 was substituted for the two parts of the polyoxyethylene sorbitan monopalmitate. The resulting material is substantially identical with that previously described in Example 7, having an apparent density of 2.7 pounds per cubic foot, a vapor permeability of from 1–3 perms, and strength and thermal properties are close to those of the cellular material of the Example 7.

Cured, expanded, cellular bodies have also been produced from a solidified mass of the foamable composition produced as described in this example, after comminution to a particle size of about 40 mesh or finer, U.S. Sieve Series, by generally the method previously described in Example 1. The resulting products also are of essentially the same properties as the cellular material set forth in Example 7.

The experimental procedures described in Examples 7 and 8 may also be carried out, with similar results, but using other cationic surface-active agents selected from the group consisting of certain tertiary amines and quaternary ammonium halide salts. Following there are listed several examples using other cationic surface-active agents.

| Example No. | Cationic surface-active agent |
|---|---|
| 9 | Coco fatty alkyl diepoxyethylene ethanol amines of the formula<br>$R-N\begin{matrix}(CH_2CH_2O)_xH\\(CH_2CH_2O)_yH\end{matrix}$<br>in which x+y=5<br>R=coco fatty alkyls of 1% capryl, 57% lauryl, 20% myristyl, 11% palmityl, 2% stearyl, 7% oleyl, 2% linoleyl, having an average molecular weight of 437. |
| 10 | n-Alkyl trimethyl ammonium chlorides in which the n-alkyl consists essentially of 90% dodecyl, 9% tetradecyl, 1% octadecenyl. |
| 11 | Stearic fatty alkyl dimethyl benzyl ammonium chlorides in which the stearic fatty alkyl consists essentially of 94% stearyl, 6% palmityl. |
| 12 | Fatty n-alkyl dimethyl benzyl ammonium chlorides in which the fatty n-alkyl consists essentially of 50% dodecyl, 30% tetradecyl, 17% hexadecyl, 3% octadecyl. |
| 13 | Stearyl fatty alkyl diepoxyethylene ethanol amine containing an average of 30 epoxyethylene units and of an average molecular weight of 2484. |
| 14 | Lauryldiethylamine. |
| 15 | Stearyldimethylamine. |
| 16 | n-Octyldiphenylamine. |
| 17 | Stearyldiethanolamine. |
| 18 | Stearyl dimethyl benzyl ammonium bromide. |
| 19 | Stearyl dimethyl benzyl ammonium iodide. |

In the above Examples 9 through 19 by using amounts within the range of 0.2 part to 10 parts of the cationic surface-active agent for each 80 parts of novolac in the ---
[5] A mixture consisting essentially of 60% n-tetradecyl dimethyl benzyl ammonium chloride, 30% n-hexadecyl dimethyl benzyl ammonium chloride, 5% n-dodecyl dimethyl benzyl ammonium chloride, 5% n-octadecyl dimethyl benzyl ammonium chloride, and having a molecular weight of about 380.

compositions, there are obtained by generally the afore-described methods, cellular materials of flow apparent densities with very small and uniform cells of a size less than about 10 mils. The cellular materials, thus produced, were tougher, more flexible, less brittle, and of lower K values than comparative cellular materials produced from corresponding compositions having about the same weight of lauryl sodium sulfate or the like replacing the agent employed in the invention.

Similar results have also been achieved using various commercially available novolacs and commercially available cationic surface-active agents of the aforedefined requisite formulae.

EXAMPLE 20

A foamable, curable, novolac-containing composition was produced according to the procedure of the second paragraph of Example 1 using a novolac produced according to the first paragraph of Example 1 but with 200 grams of p-(1-nonyl) phenoxypolyoxyethylene ethanol [6] substituted for the 200 grams of a polyoxyethylene sorbitan monopalmitate.

Five phenolic bodies in a cellular or expanded condition were then produced from the composition using the procedure of Paragraph 3 of Example 1 but employing a charge of 40 grams. The average apparent density in pounds per cubic foot of the products was 2.0; the vapor permeability in perms ranged from 1 to 3; the K values averaged ¼ B.t.u. per hour per square foot, per inch of thickness, per degree Fahrenheit; and the products had very small and uniform cells of a size averaging about 3 to 4 mils with no cells larger than 10 mils being apparent. Various other foams of different apparent densities can also be produced from the foamable composition. For example, in a like manner, with a charge of 60 grams on a kraft paper sheet in the mold there is obtained a product having an apparent density in pounds per cubic foot of about 3.0. This product had a K value and a vapor permeability very close to those of the products employing the 40 gram charges, and also had very small and uniform cells with no cells of a size larger than 10 mils being apparent.

When for purposes of comparison, but not in accordance with the invention, the procedure above was repeated except that in place of the nonylphenoxy polyoxyethylene ethanol there were substituted pentaerythritol and iso-octylphenoxy polyoxyethylene ethanol, the cellular materials which were produced had inferior properties similar to those of the bodies produced with lauryl sodium sulfate discussed in Examples 1 and 3. Additionally, small charges of the foamable compositions would not fill the mold, so that low density materials could not be produced.

EXAMPLE 21

A cured, cellular, phenolic body has been made by the modified procedure of the first paragraph of Example 2 except that two parts by weight of the p-(1-nonyl)-phenoxypolyoxyethylene ethanol was substituted for the two parts of the polyoxyethylene sorbitan monopalmitate. This material was substantially identical with that previously described in Example 20, having an apparent density of 2.7 pounds per cubic foot, a vapor permeability of from 1 to 3 perms, and strength and thermal properties very close to those of the cellular material of Example 20.

Cured, expanded, cellular bodies have also been produced from a solidified mass of the foamable composition produced as described in this example, after comminution to a particle size of about 40 mesh or finer, U.S. Sieve Series, by generally the method previously described in Example 1. The resulting products also had essentially the same properties as the cellular material set forth in Example 20.

The experimental procedures described above may also be carried out, by generally the aforedescribed methods with similar results, but using other nonylphenoxy polyoxyethylene ethanols. For example, excellent results have been achieved using p-(1-nonyl) phenoxy polyoxyethylene ethanol of an average molecular weight of 1200 and produced from ethylene oxide and 1-nonyl phenol in a mol ratio of about 23:1. Similar excellent results also are obtained with those nonylphenoxy polyoxyethylene ethanols having a mol ratio of ethylene oxide to nonylphenol from about 4:1 to about 50:1, those nonylphenoxy polyoxyethylene ethanols having the 2-nonyl, 3-nonyl, or 5-nonyl radical, and those nonylphenoxy polyoxyethylene ethanols having the nonyl radical attached at either the para or ortho position of the phenoxy ring. The compositions used amounts of nonylphenoxy polyoxyethylene ethanols within the range of 0.2 part to 10 parts for each 80 parts of novolac in the compositions to obtain cellular materials of low apparent densities with very small and uniform cells of a size less than 10 mils. The cellular materials thus produced were tougher, more flexible, less brittle, and of lower K values than comparative cellular materials produced from corresponding compositions having about the same weight of lauryl sodium sulfate or the like replacing the nonylphenoxy polyoxyethylene ethanol employed in the invention.

Similar results have also been achieved using various commercially available novolacs and commercially available nonylphenoxy polyoxyethylene ethanols.

EXAMPLE 22

A foamable, curable, novolac-containing composition was produced according to the procedure of the second paragraph of Example 1, using a novolac produced according to the first paragraph of Example 1, but with 200 grams of a polyoxyethylene glycol ester of coconut oil, fatty acids,[7] substituted for the 200 grams of a polyoxyethylene sorbitan monopalmitate.

Five phenolic bodies in a cellular or expanded condition were then produced from the foamable composition using the procedure of Paragraph 3 of Example 1 but employing 40 grams in the charges. The average apparent density in pounds per cubic foot of the products was 2.0; the vapor permeability in perms ranged from 1 to 3; and the K values averaged ¼ B.t.u. per hour per square foot, per inch of thickness, per degree Fahrenheit; and the products had very small and uniform cells of a size averaging about 3 to 4 mils with no cells larger than 10 mils being apparent. Various other foams of difference apparent densities can also be produced from the foamable composition. For example, in a like manner, with a charge of 60 grams on a kraft paper sheet in the mold there is obtained a product having an apparent density in pounds per cubic foot of about 3.0. This product had a K value and a vapor permeability very close to those of the products employing the 40 gram charges, and also had very small and uniform cells with no cells of a size larger than 10 mils being apparent.

When for purposes of comparison, but not in accordance with the invention, the procedure above was repeated except that in place of the polyoxyethylene glycol ester employed in the invention there was substituted the same weight of various polyoxyethylene glycols of average molecular weights of about 300, 400, 600, 1000, and 1500, or polyoxyethylene glycol esters of lauric, stearic, and oleic acids in which the mol ratio of ethylene oxide per mol of the acid averaged about 4:1, the cellular

---

[6] The mol ratio of ethylene oxide to 1-nonyl phenol was about 15:1, and the material had an average molecular weight of approximately 850.

[7] In which ester the mol ratio of ethylene oxide to the fatty acids averaged 5:1 and the coconut oil fatty acids consisted essentially of 1 percent capric acid, 57 percent lauric acid, 20 percent myristic acid, 11 percent palmitic acid, 2 percent stearic acid, 7 percent oleic acid, and 2 percent of linoleic acid with the ester being substantially the monoester and having a molecular weight of about 431.

materials which were produced from each had inferior properties similar to those of the bodies produced with lauryl sodium sulfate in Examples 1 and 3. Additionally small charges of such foamable compositions would not fill the mold, so that a low density material could not be produced.

EXAMPLE 23

A cured, cellular, phenolic body has been made by the modified procedure of the first paragraph of Example 2 except that two parts by weight of the polyoxyethylene glycol ester employed in Example 22 was substituted for the two parts by weight of the polyoxyethylene sorbitan monopalmitate. This material was substantially identical with that previously described in Example 22, having an apparent density of 2.7 pounds per cubic foot, a vapor permeability of from 1 to 3 perms, and strength and thermal properties very close to those of the cellular material of Example 22.

Cured, expanded, cellular bodies have also been produced from a solidified mass of the foamable composition produced as described in this example, after comminution to a particle size of about 40 mesh or finer, U.S. Sieve Series, by generally the method previously described in Example 1. The resulting products also had essentially the same properties as the cellular material set forth in Example 22.

The experimental procedures described in Examples 22 and 23 may also be carried out, by generally the aforedescribed methods with similar results, but using other of the aforedefined polyoxyethylene glycol esters of the monocarboxylic acids. For example, similar results are obtained with the polyoxyethylene glycol monoester of oleic acid in which the mol ratio of ethylene oxide per mol of the oleic acid averaged about 18:1, with the polyoxyethylene glycol esters of tall oil fatty and resin acids in which the mol ratio of ethylene oxide per mol of the acids averaged about 18:1, with the polyoxyethylene glycol ester of commercially pure capric acid in which the mol ratio of ethylene oxide per mol of capric acid averaged about 10:1; with the polyoxyethylene glycol monoester of abietic acid in which the mol ratio of ethylene oxide per mol of abietic acid averaged about 15:1; with the polyoxyethylene glycol monoester of lauric acid in which the mol ratio of ethylene oxide per mol of lauric acid averaged about 23:1; and with the polyoxyethylene glycol monoester of stearic acid in which the mol ratio of ethylene oxide to stearic acid averaged about 28:1. The composition employed amounts to these esters within the range of 0.2 part to 10 parts for each 80 parts of novolac in the compositions to obtain cellular materials of low apparent densities with very small and uniform cells of a size less than 10 mils. The cellular materials, thus produced, were tougher, more flexible, less brittle, and of lower K values than comparative cellular materials produced from corresponding compositions having about the same weight of lauryl sodium sulfate or the like replacing the polyoxyethylene glycol ester employed in the invention.

Similar results have also been achieved using various commercially available novolacs and commercially available polyoxyethylene glycol esters. For example, similar results have been obtained with the esters sold under the names of: Ethofat C/15 by Armour and Company, Chicago, Ill.; Nonisol 250 by Geigy Chemical Corporation, Yonkers, N.Y.; Emulphor EL–719 by General Aniline and Film Corporation, New York, N.Y.; Burkester R–1499 by Burkhart-Schier Chemical Company, Chattanooga, Tenn.; and Trimulso D6–12 by the Baroid Division of the National Lead Company, Houston, Tex.

EXAMPLE 24

A foamable, curable, novolac-containing composition was produced according to the procedure of the second paragraph of Example 1, using a novolac according to the first paragraph of Example 1, but with 200 grams of the sodium salt of the methyl ester of 2-nonyl-benzoyl sulfopropionic acid [8] substituted for the 200 grams of the polyoxyethylene sorbitan monopalmitate.

Five phenolic bodies in a cellular or expanded condition were then produced from the composition using the procedure of Paragraph 3 of Example 1 but using a charge of 40 grams. The average apparent density in pounds per cubic foot of the products was 2.0; the vapor permeability in perms ranged from 1 to 3; the K values averaged ¼ B.t.u. per hour per square foot, per inch of thickness, per degree Fahrenheit; and the products had very small and uniform cells of a size averaging about 3 to 4 mils with no cells larger than 10 mils being apparent. Various other foams of different apparent densities can also be produced from the foamable composition. For example, in a like manner, with a charge of 60 grams on a kraft paper sheet in the mold there is obtained a product having an apparent density in pounds per cubic foot of about 3.0. This product had a K value and a vapor permeability very close to those of the products employing the 40 gram charges, and also had very small and uniform cells with no cells of a size larger than 10 mils being apparent.

When for purposes of comparison, but not in accordance with the invention, the procedure above was repeated except that in place of the salt employed in the invention there was substituted the same weight of isopropyl naphthalene sodium sulfonate, the cellular materials which were produced had inferior properties similar to those of the bodies made with lauryl sodium sulfate in Examples 1 and 3. Additionally a small charge of the foamable composition would not fill the mold, so that a low density material could not be produced.

EXAMPLE 25

A cured, cellular, phenolic body has been made by the modified procedure of the first paragraph of Example 2 except that two parts by weight of the sodium salt of the methyl ester of 2-nonyl-benzoyl sulfopropionic acid was substituted for the two parts of the polyoxyethylene sorbitan monopalmitate. This material was substantially identical with that previously described in Example 24, having an apparent density of 2.7 pounds per cubic foot, a vapor permeability of from 1 to 3 perms, and strength and thermal properties very close to those of the cellular material of Example 24.

Cured, expanded, cellular bodies have also been produced from a solidified mass of the foamable composition produced as described in this example, after comminution to a particle size of about 40 mesh or finer, U.S. Sieve Series, by generally the method previously described in Example 1. The resulting products also had essentially the same properties, as the cellular material set forth in Example 24.

The experimental procedures described in Examples 24 and 25 may also be carried out, by generally the aforedescribed methods with similar results, but using other water-soluble salts of a substituted benzoyl sulfopropionic acid ester of the aforesaid requisite formula containing from 18 to 45 carbon atoms. For example, similar results are obtained with the potassium and ammonium salts of the methyl ester of 2-nonyl benzoyl sulfopropionic acid having the 2-nonyl radical attached ortho, meta, or para on the benzoyl ring, the sodium salt of the ethyl ester of p-phenyl-benzoyl sulfopropionic acid, the sodium salt of the phenyl ester of p-isopropylbenzoyl sulfopropionic acid, the sodium salt of the n-dodecyl ester of p-cyclohexyl-benzoyl sulfopropionic acid, the sodium salt of the lauryl ester of p-lauryl-benzoyl sulfopropionic acid, the potassium salt of the stearyl ester of o-(p-tolyl) benzoyl sulfopropionic acid; the sodium salt of the p-tolyl ester of p(p-tolyl) benzoyl sulfopropionic acid; the ammonium salt of the cyclohexanol ester of o-phenyl-benzoyl sulfopropionic acid; and

---

[8] This salt may be prepared by the method described in U.S. Pat. No. 2,548,017.

the sodium salts of the polyoxyethylene ethanol esters of p-(2-nonyl) benzoyl sulfopropionic acid containing an average of 4, 8, and 12 oxyethylene units, respectively. The compositions used amounts of the salts within the range of 0.2 part to 10 parts for each 80 parts of novolac in the compositions to obtain cellular materials of low apparent densities with very small and uniform cells of a size less than 10 mils. The cellular materials, thus produced, were tougher, more flexible, less brittle, and of lower K values than comparative cellular materials produced from corresponding compositions having about the same weight of lauryl sodium sulfate or the like replacing the salts employed in the invention.

Similar results have also been achieved using various commercially available novolacs and commercially available water-soluble salts of a substituted benzoyl sulfopropionic acid ester of the aforedefined formula. For example, excellent results have been obtained with the sodium salt of the alkylated aroyl sulfopropionic ester, sold under the name of Surfax 1410 by the E. F. Houghton & Company, Philadelphia, Pa.

EXAMPLE 26

A foamable, curable, novolac-containing composition was produced according to the procedure of the second paragraph of Example 1, using a novolac produced according to the first paragraph of Example 1, but with 200 grams of the ammonium salt of lauryl sulfate substituted for the 200 grams of a polyoxyethylene sorbitan monopalmitate.

Five phenolic bodies in a cellular condition were then produced from the composition using the procedure of Paragraph 3 of Example 1 but using 40 gram charges. The average apparent density in pounds per cubic foot of the products was 2.0; the vapor permeability in perms ranged from 1 to 3; the K values average ¼ B.t.u. per hour per square foot, per inch of thickness, per degree of Fahrenheit; and the products had very small and uniform cells of a size averaging about 3 to 4 mils with no cells larger than 10 mils being apparent. Various other foams of different apparent densities can also be produced from the foamable composition. For example, in a like manner, with a charge of 60 grams on a kraft paper sheet in the mold there is obtained a product having an apparent density in pounds per cubic foot of about 3.0. This product had a K value and a vapor permeability very close to those of the products employing the 40 gram charges and also had very small and uniform cells with no cells of a size larger than 10 mils being apparent.

When for purposes of comparison, but not in accordance with the invention, the procedure above was repeated except that in place of the ammonium salt of lauryl sulfate employed in the invention there was substituted the same weight of the sodium salt of the acid sulfate of the p-(1-nonyl) phenoxy polyoxyethylene ethanol having an average molecular weight of approximately 800, or the same weight of the sodium salt of the acid sulfate of the iso-octyl phenoxy polyoxyethylene ethanol having a mole ratio of ethylene oxide to iso-octyl phenol of about 4:1, or the same weight of the sodium salt of the acid sulfate of

$C_9H_{19}$     $OSO_3Na$ the cellular materials which were produced from each had inferior properties similar to those of bodies produced with lauryl sodium sulfate as set forth in Examples 1 and 3. Additionally, small charges of such foamable compositions woul not fill the mold, so that a low density material could not be produced.

EXAMPLE 27

A cured, cellular, phenolic body has been made by the modified procedure of the first paragraph of Example 2 except that two parts by weight of the ammonium salt of lauryl sulfate was substituted for the two parts of the polyoxyethylene sorbitan monopalmitate. This material was substantially identical with that previously described in Example 26, having an apparent density of 2.7 pounds per cubic foot, a vapor permeability of from 1 to 3 perms, and strength and thermal properties very close to those of the cellular material of Example 26.

Cured, expanded, cellular bodies have also been produced from a solidified mass of the foamable composition produced as described in this example, after comminution to a particle size of about 40 mesh or finer, U.S. Sieve Series, by generally the method previously described in Example 1. The resulting products also had essentially the same properties, as the cellular material set forth in Example 26.

The experimental procedure described in Examples 26 and 27 may also be carried out, by generally the aforedescribed methods with similar results, but using other ammonium salts of the acid sulfates of the certain hydroxy-containing compounds. For example, similar results are obtained with the ammonium salts of the acid sulfates of the p-(1-nonyl)phenoxy polyoxyethylene ethanols having mole ratios of ethylene oxide to the nonylphenol of about 4:1 and 10:1, the ammonium salt of stearyl sulfate, the ammonium salts of the acid sulfates of the oxyethylated coconut oil fatty acid esters containing from about 1 to 15 oxyethylene units, the ammonium salt of the acid sulfate of nonylphenol, the ammonium salt of the acid sulfate of nonylnapthol, and the ammonium salt of the acid sulfate of the nonylphenoxy polyoxyethylene ethanol having a mole ratio of ethylene oxide to nonylnapthol of about 2:1. The compositions employed amounts of the salts within the range of 0.2 part to 10 parts for each 80 parts of novolac in the compositions to obtain cellular materials of low apparent densities with very small and uniform cells of a size less than 10 mils. The cellular materials, thus produced, were tougher, more flexible, less brittle, and of lower K values than comparative cellular materials produced from corresponding compositions having about the same weight of lauryl sodium sulfate or the like replacing the ammonium salt of the acid sulfate of certain hydroxy-containing compounds which are employed in the invention.

Similar results have also been achieved using various commercially available novolacs and commercially available ammonium salts of the acid sulfate of such hydroxy-containing compounds. For example, excellent results have been obtained with the ammonium salts sold under the names of Stepanol B–153 by Stephan Chemical Company, Chicago, Ill., and Trepanol AM by Treplow Products, Inc., Paterson, N.J.

The above exhaustive explanation clearly demonstrates that those materials which hydrogen bond to the labile hydrogen of a polymerizable resin will delay the polymerization of the resin until after the blowing agent has expanded the resin to produce a small uniform cell structure. This uniform cell structure is produced even though the material is heated nonuniformly. It will be seen that a considerable temperature gradient will exist in the foaming operations above described wherein the foamable composition is cured in a heated mold. The necessary heat to initiate reaction in such a mold must be transferred from the surfaces of the mold cavity into the polymerizable mixture. Foamed materials are in general good insulating materials, and therefore, a considerable temperature gradient will exist during the foaming and curing operation, and the center of the material is the last to react.

It is difficult to devise a test which will demonstrate the differences that occur between a composition that includes the hydrogen bonding agent of the present invention and a composition which does not include the hydrogen bonding agent, when the compositions are heated in a mold. While certain differences exist in the conditions inside of a mold and those of the tests which follow, the following tests graphically demonstrate the efficacy of the principles of the present invention, and the overall effect that is achieved by curing a foamable composition inside of a heated mold.

EXAMPLE 28

Figure 3:
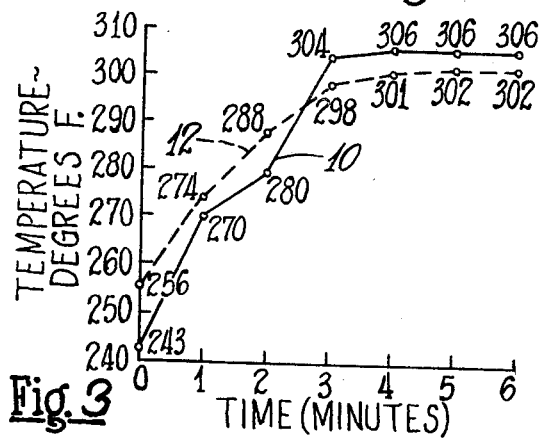

One-hundred-and-five parts by weight of the novalac resin of Example 1 where mixed with 3 parts by weight of hexamethylenetetramine. A beaker containing these materials was placed in an oil bath having a temperature of 310° F. and continually stirred, and the temperature of the ingredients was noted at one minute intervals. The temperatures observed when plotted as shown in FIG. 3 give the curve designated by the solid line 10 of FIG. 3.

By way of comparison a material of the present invention comprising 105 parts by weight of the novalac resin of Example 1, 3 parts by weight of hexaethylenetramine, and 3 parts by weight of ethylenesorbitanmonopalmitate was thoroughly mixed and a beaker containing the same was immersed in the oil bath described above having a temperature of 310° F. The temperature of this material was also observed at one minute intervals and are plotted and connected by the dotted line 12 of FIG. 3. Both of the above described materials were continually stirred by a thermometer until they became too viscous so that the temperatures indicated are the average temperature of the bath. It will be apparent, however, that the materials at the outside edge of the beaker are at a temperature above the average temperature of the bath and therefore a reaction takes place continuously in each material adjacent the surface of the beaker in which it is contained. Because these materials are continually mixed, the reacting materials adjacent the surface of the beaker are continually replaced by materials from the center of the beaker, and when moving to the center are quenched to the average temperature of the reactants. The above procedure therefore gives an overall averaging effect of the reaction which takes place, and it will be seen from the above described curves shown in FIG. 3, that the reaction of the material containing the hydrogen bonding agent (ethylenesorbitanmonopalmitate) is not only retarded, but ultimately approaches the same degree of polymerization as does the unhydrogen bonded material. The tests above described were stopped after six minutes because the rate of heat transfer into the materials of the beaker from the oil at 310° F. had fallen off to such a slow rate as to make further testing in the oil bath impractical. It will be apparent that materials heated in a beaker immersed in a heated bath approach the temperature of the bath asymmtotically. The material of curve 10 became too thick to stir after approximately four minutes while that of curve 12 did not become too thick to stir until after six minutes.

The following test illustrates how the same phenomenon occurs in another type of resin, and further illustrates how the polymerization reaction of a material that is hydrogen bonded will go to the same degree of completion, when given enough time, as does an unhydrogen bonded resin.

EXAMPLE 29

One-hundred-and-five parts by weight of a melamine formaldehyde resin formed by reacting melamine and formaldehyde in a mol ratio of 1 to 3 and which can be purchased from the American Cyanamide Company under the trade designation 405-S was mixed with 3 parts by weight of hexamethylenetetramine. A beaker containing these materials was placed in an oil bath having a temperature of 284° F. The contents of the beaker was continually stirred and its temperature noted at one minute intervals. The temperatures noted are plotted in FIG. 4 and are connected by the solid line 14.

By way of contrast, a material of the present invention and comprising 105 parts by weight of the same melamine formaldehyde resin given above, 3 parts by weight of hexamethylenetetramine, and 3 parts by weight of polyethylene sorbitanmonopalmitate were mixed in a beaker which was then inserted in the same oil bath given above. The contents of the beaker was continually stirred and its temperature noted at one minute intervals. These temperatures are plotted in FIG. 4 and are connected by the dash line 16.

The beakers containing both materials above described were held immersed in the oil bath for ten minutes. Thereafter, because of the small rate of temperature rise, the beakers were placed on a hot plate whose temperature was 400° F. Although the hot plate was at a higher temperature than the oil bath, less surface of the beaker is heated. Because the material that was not hydrogen bonded had fully reacted, no further temperature rise occurred. By way of contrast, the material according to the present invention and which did contain the hydrogen bonding agent, continued to react until its temperature reached the same temperature as that of the nonhydrogen bonded material. This indicates that not all of the hydrogen bonds had previously broken, and that this material polymerizes ultimately to the same final degree as does the nonhydrogen bonded material. The nonhydrogen bonded material became to thick to stir after about four minutes, while the hydrogen bonded material could be stirred during approximately the first ten minutes of heating.

As previously indicated the principles of the present invention are equally applicable to all types of resins having a labile hydrogen that reacts during polymerization. This is further illustrated by the following graphical illustration.

EXAMPLE 30

Figure 5:
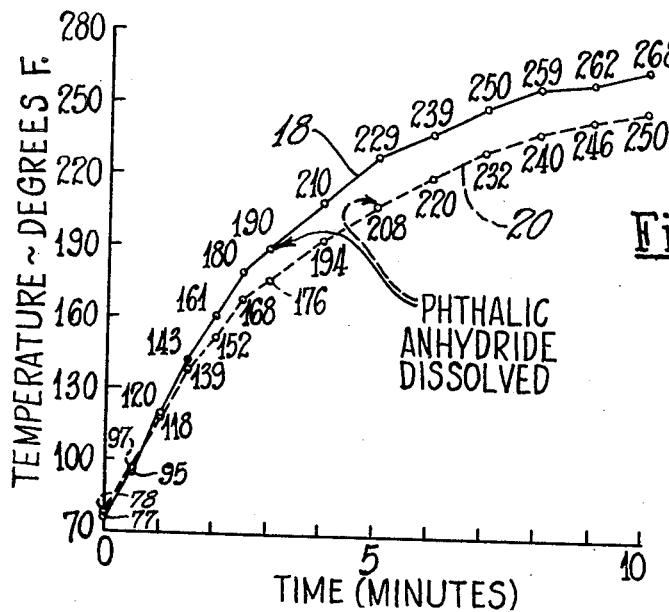

One-hundred parts by weight of a polyester resin formed by reacting fumaric acid and the reaction product of 2 mols of ethylene oxide and bisphenol A in a mol ratio of approximately 1 to 1 was mixed with 35 parts by weight of phthalic anhydride. The resin above described was purchased commercially from the Atlas Powder Company under the trade name Atlac 382–05A and is made by the process of U.S. Pat. 2,634,251. A beaker of the above material was placed in an oil bath having a temperature of 280° F. and continually stirred. The temperature of the material was noted at one minute intervals, and these temperatures are plotted in FIG. 5 and are connected by the solid line 18.

By contrast a mixture comprising 100 parts by weight of the same polyester resin given above, 35 parts by weight of phthalic anhydride, and 4 parts by weight of ethylene sorbitanmonopalmitate was made. A beaker of this material was inserted in the same oil bath above described and its temperature noted at one minute intervals. These temperatures are plotted in FIG. 5 and are connected by the dash line 20. The phthalic anhydride dissolved in the material that did not contain the hydrogen bonding agent at approximately 190° after three minutes, while the phthalic anhydride did not dissolve in the material that contained the hydrogen bonding agent until after five minutes and a temperature of 208° F. was reached. It will clearly be seen that the reaction of the phthalic anhydride and the polyester resin occurred much more quickly in the nonhydrogen bonded resin, than occurred in the hydrogen bonded resin. The nonhydrogen bonded polyester resin became too thick to stir after approximately five minutes of heating, while the hydrogen bonding resin could be stirred until after approximately nine minutes. These same materials when heated for an additional period will reach the same degree of completion as shown in Example 29.

The above tests provide an overall indication of the effects achieved by the hydrogen bonding of the present invention. The following tests provide further indication of the nature of the hydrogen bonding mechanism.

EXAMPLE 31

One-hundred-and-five parts by weight of the novalac resin of Example 1 were mixed with 3 parts by weight of hexamethylenetetramine. A breaker containing these materials was placed in a hot oil bath, and thoroughly stirred until they reached a specific temperature. The beaker was then removed from the oil bath, and placed in an insulated container to determine if an exotherm was occurring. The above mixture was heated to 248° F. in the oil bath, and was placed in the insulated container, but no rise in temperature occurred. The materials were thereafter heated to 258° F. and placed in the insulated container again. The temperature then rose while the beaker was in the insulated container to a temperature of 268° F. within one minute after being removed from the heated oil bath. The beaker was thereafter placed in the oil bath again and its contents stirred until it reached a temperature of 278° F., and was again transferred to the insulated container. Thereafter the temperature rose to 284° F. in one minute, and rose to a temperature of 287° F. in an additional minute. After three minutes in the insulated container, the temperature of the material dropped to 286° F. The above data clearly indicates that the reaction of the novalac and the hexamethylenetetramine is spontaneous at a temperature of approximately 258° F.

EXAMPLE 32

The above test was repeated using a mixture comprising 105 parts by weight of the same novalac resin, 3 parts by weight of hexamethylenetetramine, and 3 parts of polyoxyethylenesorbitanmonopalmitate. The beaker containing these materials was heated to 250° F. in the oil bath and then placed in the insulated container. No rise in temperature occurred. The beaker was then placed back in the hot oil bath and the mixture stirred until it reached 263° F., at which time it was again transferred to the insulated container with the same result. The process was repeated at a temperature of 272° F. with no exotherm occuring, and was again repeated at a temperature of 284° F. The materials at a temperature of 284° F. rose to a temperature of 291° F. within one minute after being transferred to the insulated container. After remaining one more minute in the insulated container, the temperature of the mixture was recorded at 289° F., indicating the completion of the reaction.

The above tests clearly demonstrate that the nonhydrogen bonded resin polymerizers either over a range of temperature or at several exotherms beginning at a temperature of approximately 258° F. When the same material is hydrogen bonded according to the principles of the present invention, however, the polymerization does not occur until a considerably higher temperature is reached and then proceeds quickly to completion. These tests, therefore, indicate that the polymerizable resin is "plugged off" by the hydrogen bonding agent, and that the hydrogen bonds of the hydrogen bonding agent break over a narrow temperature range. The above tests also indicate that when the hydrogen bond are broken, the polymerization of the resin can go to substantially the same degree of completion, as can material that had not previously been hydrogen bonded or "plugged off."

The above examples clearly demonstrate the nature and scope, as well as the highly significant nature of the present invention. While this scope and nature has been extensively demonstrated by specific examples, it is not intended that the invention shall be limited to these examples, but shall cover all adaptations, modifications, and arrangements thereof, which will occur to those skilled in the art by a study of this disclosure, and which are covered by the following claims.

What we claim is:

1. An essentially anhydrous polymerizable composition of improved stability consisting essentially of: about 80 parts of dry polymerizable thermosettable aldehyde condensation molecules selected from the group consisting of phenol-formaldehyde, urea-formaldehyde, and melamine-formaldehyde polymers produced from molal ratios of reactants giving a deficiency of aldehyde and leaving labile hydrogen; and crosslinking molecules having groups reactive to displace the labile hydrogen from the polymerizable molecules without forming water; and about 0.2 part to about 10 parts of an effective hydrogen bonding surface active agent selected from the group consisting of:

(1) a polyoxyethylene sorbitan monoester of an acid having the generic formula R—COOH, where R is a hydrocarbon radical having from about 8 to about 20 carbon atoms;

(2) an oxazoline compound selected from the group consisting of 2-substituted-2-oxazoline compounds of the formula

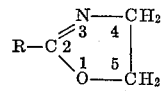

in which R is selected from the group consisting of the phenyl radical and the aliphatic radicals, $C_nH_{2n+1}$ and $C_nH_{2n}$, wherein $n$ represents a whole number integer of from 5 to 27, and 4-substituted derivatives of said 2-substituted-2-oxazoline compounds having from one to two hydrogen atoms replaced by from one to two radicals, respectively, selected from the group consisting of an alkyl radical of from 1 to 4 carbon atoms, the hydroxymethyl radical, the hydroxyethyl radical, and the radicals from esterification of the hydroxymethyl and hydroxyethyl radicals with a monocarboxylic acid from the group consisting of benzoic acid and fatty acids of from 6 to 28 carbon atoms;

(3) imidazoline compounds of the formula

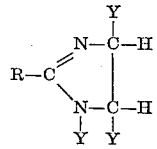

in which R is selected from the group consisting of the phenyl radical and ailphatic hydrocarbon radicals of from 5 to 27 carbon atoms, and in which Y is selected from the group consisting of hydrogen, hydroxymethyl, hydroxyethyl, and alkyl and alkylene radicals of up to 5 carbon atoms, and their imidazolinium halide salts of the formula

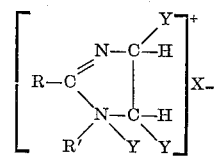

in which R' is selected from the group consisting of the benzyl radical, and alkyl and alkylene radicals of up to 28 carbon atoms, and in which X is a halogen radical selected from the group consisting of chlorine, bromine, and iodine radicals;

(4) tertiary amines and quaternary ammonium halide salts of the formulae $R_3N$ an $d[R_4N]+X-$, respectively, in which each R is a radical selected from the group consisting of $C_nH_{2n+1}$, $C_mH_{2m}$, $C_6H_5$, $C_6H_5CH_2$, and $(CH_2CH_2O)_xH$ wherein $n$ represents a whole number integer of from 1 to 28, $m$ represents a whole number integer of from 1 to 28, and $x$ represents a whole number integer of from 1 to 30, in which at least one R is a long-chain aliphatic radical selected from the group consisting of $C_nH_{2n+1}$ and $C_mH_{2m}$ wherein $n$ and $m$ are more than 7, and in which X is a halogen selected from the group consisting of chlorine, bromine, and iodine;

(5) a nonylphenoxy polyoxyethylene ethanol having a mol ratio of ethylene oxide to nonylphenol of from 4:1 to about 50:1;

(6) a polyoxyethylene glycol ester with an average of from 5 to 30 oxyethylene groups of an organic acid selected from the group consisting of monocarboxylic resin acids containing from 17 to 20 carbon atoms and monocarboxylic fatty acids containing from 10 to 24 carbon atoms;

(7) a water-soluble salt of a substituted benzoyl sulfopropionic acid ester of the formula

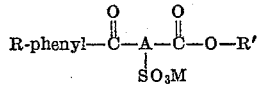

containing from 18 to 45 carbon atoms in which: R phenyl is a substituted phenyl radical having a hydrocarbon radical substituent selected from the group consisting of the phenyl radical, the cyclohexyl radical, and alkyl radicals of from 1 to 15 carbon atoms; R' is a radical containing up to 20 carbon atoms selected from the group consisting of alkyl radicals, the phenyl radical, the cyclohexyl radical, and the $CH_2CH_2O)_xH$ radical wherein $x$ is a whole number integer, A is the ethylene radical; and M is a cation selected from the group consisting of sodium, potassium, and ammonium cations; and (8) an ammonium salt of the acid sulfate of an hydroxy containing compound selected from the group consisting of alkyl carbinols containing from 8 to 18 carbon atoms, alkyl-substituted phenols containing from 10 to 24 carbon atoms, alkyl-substituted naphthols containing from 12 to 22 carbon atoms, and the oxyethylene ether hydroxyl derivatives of said carbinols, phenols, and naphthols which contain from 1 to 15 oxyethylene units and terminal hydroxyl group, said hydrogen bonding surface active agent being hydrogen bonded to said labile hydrogen to prevent reaction of said polymerizable molecules at ambient temperatures.

2. An essentially anhydrous foamable polymerizable composition consisting essentially of: about 80 parts of polymerizable thermosettable aldehyde condensation molecules selected from the group consisting of phenol-formaldehyde, urea-formaldehyde, and melamine-formaldehyde polymers produced from molal ratios of reactants giving a deficiency of aldehyde and leaving labile hydrogen; and molecules having groups reactive to displace the labile hydrogen from the polymerizable molecules without forming water; from about 1 part to about 5 parts of a blowing agent which forms a gaseous decomposition product at an elevated temperature; and from about 0.2 part to about 10 parts of an effective hydrogen bonding surface active agent selected from the families consisting of:

(1) a polyoxyethylene sorbitan monoester of an acid having the generic formula R—COOH, where R is a hydrocarbon radical having from about 8 to 20 carbon atoms;

(2) an oxazoline compound selected from the group consisting of 2-substituted-2-oxazoline compounds of the formula

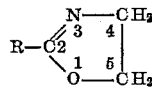

in which R is selected from the group consisting of the phenyl radical and the aliphatic radicals, $C_nH_{2n+1}$ and $C_nH_{2n}$, wherein $n$ represents a whole number integer of from 5 to 27, and 4-substituted derivatives of said 2-substituted-2-oxazoline compounds having from one to two hydrogen atoms replaced by from one to two radicals, respectively, selected from the group consisting of an alkyl radical of from 1 to 4 carbon atoms, the hydroxymethyl radical, the hydroxyethyl radical, and the radicals from esterification of the hydroxymethyl and hydroxyethyl radicals with a monocarboxylic acid from the group consisting of benzoic acid and fatty acids of from 6 to 28 carbon atoms;

(3) imidazoline compounds of the formula

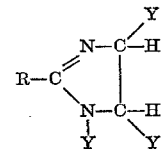

in which R is selected from the group consisting of the phenyl radical and aliphatic hydrocarbon radicals of from 5 to 27 carbon atoms, and in which Y is selected from the group consisting of hydrogen, hydroxymethyl, hydroxyethyl, and alkyl and alkylene radicals of up to 5 carbon atoms, and their imidazolinium halide salts of the formula

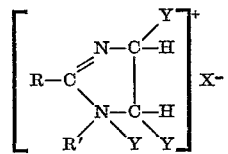

in which R' is selected from the group consisting of the benzyl radical, and alkyl and alkylene radicals of up to 28 carbon atoms, and in which X is a halogen radical selected from the group consisting of chlorine, bromine, and iodine radicals;

(4) tertiary amines and quaternary ammonium halide salts of the formulae $R_3N$ and $[R_4N]+X^-$, respectively, in which each R is a radical selected from the group consisting of $C_nH_{2n+1}$, $C_mH_{2m}$, $C_6H_5$, $C_6H_5CH_2$, and $(CH_2CH_2O)_xH$ wherein $n$ represents a whole number integer of from 1 to 28, $m$ represents a whole number integer of from 1 to 28, and $x$ represents a whole number integer of from 1 to 30, in which at least one R is a long-chain aliphatic radical selected from the group consisting of $C_nH_{2n+1}$ and $C_mH_{2m}$ wherein $n$ and $m$ are more than 7, and in which X is a halogen selected from the group consisting of chlorine, bromine, and iodine;

(5) a nonylphenoxyl polyoxyethylene ethanol having a mol ratio of ethylene oxide to nonylphenol of from about 4:1 to about 50:1;

(6) a polyoxyethylene glycol ester with an average of from 5 to 30 oxyethylene groups of an organic acid selected from the group consisting of monocarboxylic resin acids containing from 17 to 20 carbon atoms and monocarboxylic fatty acids containing from 10 to 24 carbon atoms;

(7) a water soluble salt of a substituted benzoyl sulfopropionic acid ester of the formula

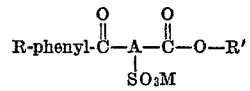

containing from 18 to 45 carbon atoms in which: R-phenyl is a substituted phenyl radical having a hydrocarbon radical substituent selected from the group consisting of the phenyl radical, the cyclohexyl radical, and alkyl radicals of from 1 to 15 carbon atoms; R' is a radical containing up to 20 carbon atoms selected from the group consisting of alkyl radicals, the phenyl radical, the cyclohexyl radical, and the $(CH_2CH_2O)_xH$ radical wherein $x$ is a whole number integer; A is the ethylene radical; and M is a cation selected from the group consisting of sodium, potassium, and ammonium cations; and (8) an ammonium salt of the acid sulfate of an hydroxy-containing compound selected from the group consisting of alkyl carbinols containing from 8 to 18 carbon atoms, alkyl-substituted phenols containing from 10 to 24 carbon atoms, alkyl-substituted naphthols containing from 12 to 22 carbon atoms, and the oxyethylene ether hydroxyl derivatives of said carbinols, phenols, and naphthols which contain from 1 to 15 oxyethylene units and a terminal hydroxyl group, said hydrogen bonding surface active agent being hydrogen bonded to said labile hydrogen to prevent reaction of said polymerizable molecules at ambient temperatures.

3. A foamed material produced by curing, at an elevated temperature, the composition claimed in claim 2.

4. A composition according to claim 2 wherein the polymerizable molecules are a thermosetable phenolic novalac material.

5. A composition according to claim 2 wherein the surface-active agent is a polyoxyethylene sorbitan monoester and the mol ratio of ethylene oxide groups to sorbitan monoester groups is from about 3:1 to about 20:1.

6. A composition according to claim 5 wherein said monoester is of an alkyl carboxylic acid wherein the alkyl radical has from about 8 to about 20 carbon atoms, and wherein the mol ratio of ethylene oxide groups to sorbitan monoester groups is from about 3:1 to about 20:1.

7. A composition according to claim 5 wherein said monoester is of an alkenyl carboxylic acid wherein the alkenyl radical has from about 8 to about 20 carbon atoms, and wherein the mol ratio of ethylene oxide groups to sorbitan monoester groups is from about 3:1 to about 20:1.

8. A composition according to claim 4 wherein the surface-active agent is a mixture of 2-substituted-2-oxazoline compounds and the blowing agent is dinitrosopentamethylene tetramine.

9. A composition according to claim 4 wherein the surface-active agent is a mixture of substituted derivative of the 2-substituted-2-oxazoline compounds and in which the blowing agent is dinitrosophentamethylene tetramine.

10. A composition according to claim 2 wherein the surface-active agent is a liquid oxazoline compound of a molecular weight less than about 400.

11. A composition according to claim 2 wherein the surface-active agent is an oxazoline, and a major portion thereof is 2-heptyl-4-methyl-4-octanooxymethyl-2-oxazoline.

12. A composition according to claim 2 wherein the surface-active agent is an oxazoline, and a major portion thereof is 2-heptadecyl-4-hydroxyethyl-2-oxazoline.

13. A composition according to claim 2 wherein the surface-active agent is an oxazoline, and a major portion thereof is 2-undecyl-4-lauroxymethyl-2-oxazoline.

14. A composition according to claim 4 wherein the surface-active agent is a mixture of imidazoline compounds and in which the blowing agent is dinitrosopentamethylene tetramine.

15. A composition according to claim 4 wherein the surface-active agent is a mixture of imidazolinium halide salts and in which the blowing agent is dinitrosopentamethylene tetramine.

16. A composition according to claim 2 wherein the surface-active agent is methyl 1-(2-hydroxymethyl)-2-n-heptadecyl-imidazolinium chloride.

17. A composition according to claim 2 wherein a major portion of the surface-active agent is methyl 1-(2-hydroxymethyl)-2-n-heptadecylimidazolinium bromide.

18. A composition according to claim 2 wherein a major portion of the surface-active agent is 2-undecyl-imidazoline.

19. A composition according to claim 4 wherein the surface-active agent is a tetriary amine, the long-chain R thereof is a fatty hydrocarbon radical, and the blowing agent is dinitrosopentamethylene tetramine.

20. A composition according to claim 2 wherein the surface active agent is a mixture of tertiary amines of a molecular weight of from 200 to 750.

21. A composition according to claim 2 wherein the surface-active agent is a mixture of quaternary ammonium halide salts of a molecular weight of from 225 to 800.

22. A composition according to claim 2 wherein a major portion is n-tetradecyl dimethyl benzyl ammonium chloride.

23. A composition according to claim 2 wherein a major portion is a coco fatty alkyl diepoxyethylene ethanol amine having an average of 5 epoxyethylene units.

24. A composition according to claim 2 wherein a major portion is n-dodecyl trimethyl ammonium chloride.

25. A composition according to claim 2 wherein a major portion is stearyl dimethyl benzyl ammonium chloride.

26. A composition according to claim 4 wherein the surface-active agent is a nonylphenoxy polyoxyethylene ethanol, the mol ratio of ethylene oxide to monylphenol is from about 6:1 to about 25:1, the average molecular weight thereof is between about 450 and 1300, and the blowing agent is dinitrosopentamethylene tetramine.

27. A composition according to claim 2 wherein the surface-active agent is a p-nonylphenoxy polyoxyethylene ethanol.

28. A composition according to claim 2 wherein the surface-active agent is a p-(1-nonyl) phenoxy polyoxyethylene ethanol and the mol ratio of ethylene oxide to 1-nonylphenol is about 15:1.

29. A composition according to claim 2 wherein the surface-active agent is a p-(1-nonyl) phenoxy polyoxyethylene ethanol and the mol ratio of ethylene oxide to 1-nonylphenol is about 15:1.

30. A composition according to claim 4 wherein the surface-active agent is a polyoxyethylene glycol ester having a molecular weight within the range of from 425 to 975, and the blowing agent is dinitrosopentamethylene tetramine.

31. A composition according to claim 2 wherein the surface-active agent is a mixture of polyoxyethylene glycol monoesters of straight-chain saturated monocarboxylic fatty acids, and the ester mixture has an average molecular weight within the range of from 425 to 975.

32. A composition according to claim 2 wherein the surface-active agent is a polyoxyethylene glycol monoester of lauric acid in which the mol ratio of ethylene oxide to lauric acid averages 5:1.

33. A composition according to claim 2 wherein the surface-active agent is a polyoxyethylene glycol ester of oleic acid in which the mol ratio of ethylene oxide to oleic acid averages about 18:1.

34. A composition according to claim 2 wherein the surface-active agent is a polyoxyethylene glycol ester of tall oil fatty and resin acids in which the mol ratio of ethylene oxide to the acids averages about 18:1.

35. A composition according to claim 4 wherein the surface-active agent is a water-soluble salt of substituted benzoyl sulfopropionic acid ester containing from 20 to 30 carbon atoms, and the blowing agent is dinitrosopentamethylene tetramine.

36. A composition according to claim 4 wherein the surface-active agent is the sodium salt of the methyl ester of 2-nonylbenzoyl sulfopropionic acid.

37. A composition according to claim 4 wherein the surface-active agent is an ammonium salt of the acid salt of an hydroxy-containing compound, and has a molecular weight between 200 to 700, and the blowing agent is dinitrosopentamethylene tetramine.

38. A composition according to claim 4 wherein the surface-active agent is the ammonium salt of lauryl sulfate.

39. A composition according to claim 4 wherein the surface-active agent is an ammonium salt of the acid sulfate of a p-(1-nonyl-phenoxy polyoxyethylene ethanol having a mol ratio of ethylene oxide to the nonyl-phenol of about 4:1.

40. A composition according to claim 4 wherein the surface-active agent is a cationic quaternary ammonium halide salt, the long chain R thereof is a fatty hydrocarbon radical, and blowing agent is dinitrosopentamethylene tetramine.

41. A composite comprising: a pair of sheet materials separated by the composition of claim 5.

42. A composite of claim 41 wherein the composition is reinforced by a mass of intermeshed glass fibers.

References Cited

UNITED STATES PATENTS

| | | | |
|---|---|---|---|
| 2,993,871 | 7/1961 | Shannon et al. | |
| 3,020,254 | 2/1962 | Less et al. | 260—59 |
| 3,081,269 | 3/1963 | Shannon et al. | 260—59 |
| 3,118,850 | 1/1964 | Cooper | 260—59 |
| 3,197,435 | 7/1965 | Ronay et al. | 260—59 |
| 3,218,271 | 11/1965 | Wong et al. | |
| 2,446,429 | 8/1948 | Nelson et al. | |
| 2,629,698 | 2/1953 | Sterling | 260—2.5 |
| 2,933,461 | 4/1960 | Mullen | 260—2.5 |
| 3,298,973 | 1/1967 | Quarles et al. | 260—2.5 |

MURRAY TILLMAN, Primary Examiner

W. J. BRIGGS, SR., Assistant Examiner

U.S. Cl. X.R.

161—263, 264; 260—59, 71, 72.5